(12) United States Patent
Roy et al.

(10) Patent No.: US 10,941,801 B2
(45) Date of Patent: Mar. 9, 2021

(54) ANCHOR ASSEMBLY

(71) Applicant: BOMBARDIER RECREATIONAL PRODUCTS INC., Valcourt (CA)

(72) Inventors: Nicolas Roy, Richelieu (CA); Maxime Valence, Saint-Cesaire (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 242 days.

(21) Appl. No.: 16/103,256

(22) Filed: Aug. 14, 2018

(65) Prior Publication Data
US 2019/0186524 A1    Jun. 20, 2019

Related U.S. Application Data

(60) Provisional application No. 62/608,142, filed on Dec. 20, 2017.

(51) Int. Cl.
*F16B 21/08* (2006.01)
*F16B 39/12* (2006.01)
(Continued)

(52) U.S. Cl.
CPC .......... *F16B 21/086* (2013.01); *F16B 37/043* (2013.01); *F16B 37/044* (2013.01);
(Continued)

(58) Field of Classification Search
CPC ...... F16B 21/086; F16B 21/088; F16B 21/08; F16B 37/043; F16B 37/044; F16B 2200/506; B63B 3/142
See application file for complete search history.

(56) References Cited

U.S. PATENT DOCUMENTS 2,836,215 A * 5/1958 Rapata ............... F16L 3/13
411/15
3,476,165 A * 11/1969 Vaughn ............. F16B 41/002
411/103
(Continued)

OTHER PUBLICATIONS

Earnest Technical Bulletin, Published May 12, 2012, Earnest Machine <https://www.earnestmachine.com/sites/default/files/products/imported/NNM.pdf> (Year: 2012).*

(Continued)

*Primary Examiner* — Victor D Batson
*Assistant Examiner* — Amit Singh Dhillon
(74) *Attorney, Agent, or Firm* — BCF, LLP

(57) ABSTRACT

An anchor assembly for insertion in a panel aperture in a receiving panel has a flange. The flange has an engagement surface locatable on a first side of the receiving panel. A plurality of resilient arms project from the engagement surface and are insertable in the panel aperture. At least two of the plurality of resilient arms define a channel therebetween for receiving a threaded fastener. The channel is sized to limit inward deflection of the at least two of the plurality of resilient arms when the threaded fastener extends within the channel. A threaded surface is located in the flange and forms at least in part an anchor aperture for alignment with the panel aperture. The channel is aligned with the anchor aperture. The threaded surface is located between the plurality of resilient arms and is adapted for threadingly engaging the threaded fastener.

18 Claims, 22 Drawing Sheets

(51) Int. Cl.
*F16B 37/04* (2006.01)
*B63B 3/14* (2006.01)

(52) U.S. Cl.
CPC ............. *F16B 39/12* (2013.01); *B63B 3/142* (2013.01); *F16B 2200/506* (2018.08)

(56) References Cited

U.S. PATENT DOCUMENTS

| | | | |
|---|---|---|---|
| 4,208,944 A * | 6/1980 | Moryl | F16B 37/043 |
| | | | 411/182 |
| 5,636,891 A * | 6/1997 | Van Order | B60N 3/026 |
| | | | 224/313 |
| 6,857,962 B2 | 2/2005 | Weedon | |
| 8,016,530 B2 * | 9/2011 | Johnson | F16B 5/065 |
| | | | 411/173 |
| 8,226,339 B2 | 7/2012 | Neri | |
| 2009/0180842 A1 * | 7/2009 | Johnson | F16B 5/065 |
| | | | 411/101 |
| 2011/0091301 A1 * | 4/2011 | Shimizu | F16B 37/043 |
| | | | 411/511 |
| 2013/0039718 A1 * | 2/2013 | Fellows | F16B 37/0842 |
| | | | 411/112 |
| 2016/0208839 A1 * | 7/2016 | Vidal | F16B 37/02 |

OTHER PUBLICATIONS

Well nut: In Wikipedia (The Free Encyclopedia) [online]. Wikipedia contributors, Nov. 8, 2017; [retrieved on Aug. 22, 2018]. Retrieved from the Internet: https://en.wikipedia.org/w/index.php?title=Well_nut&oldid=809350365.

* cited by examiner

ANCHOR ASSEMBLY

CROSS-REFERENCE TO RELATED APPLICATION

The present application claims priority to U.S. Provisional Patent Application Ser. No. 62/608,142, filed Dec. 20, 2017, entitled "Anchor Assembly", which is incorporated by reference herein in its entirety.

FIELD OF TECHNOLOGY

The present technology relates to an anchor assembly for attaching threaded fasteners to a receiving panel.

BACKGROUND

When it comes to fastening a component to a receiving panel having a visible side, for which access is available, and an opposed blind side, for which access is unavailable, and is of a material that cannot readily receive screws or the like, different suitable anchor assemblies exist. For example, anchor assemblies can be overmolded on the receiving panel. Similarly, a metal plate having a hole with female threads therein can be bonded on one side of the receiving panel. However, such anchor assemblies can be complex and expensive to implement under certain circumstances.

Other solutions include the use of rivet nuts or well nuts inserted in an aperture defined in the receiving panel. Rivet nuts (commonly referred to as "rivnuts") are collapsible metallic inserts that deform around an opening when a bolt is engaged and tightened thereto. However, rivet nuts are expensive, require very high tolerances for the aperture cut into the receiving panel, require special tools and cannot be easily replaced when broken (for example, when the bolt becomes stripped or seized) without damaging the receiving panel.

Well nuts are another type of collapsible insert that have a cylindrical body made of a resilient polymeric material. The body has an axially extending opening, a flange located at one end of the body and a rigid nut embedded at the opposed end of the body. After the body of the well nut has been inserted in an aperture in the receiving panel, a bolt can be inserted in the axially-extending opening, engage the nut and, upon tightening of the bolt, the body resiliently deforms and abuts on the blind side of the receiving panel. Well nuts have the benefit of providing a watertight connection. However, well nuts provide relatively little resistance to torque and, as a result, attempting to unscrew the bolt can result in the body of the well nut slipping within the aperture, and the receiving panel may have to be damaged in order to remove the well nut therefrom. This is especially inconvenient for a receiving panel that is, for example, a service panel that is removed periodically for maintenance of a vehicle.

Therefore, there is a desire for anchor assemblies suited for fastening a component to a receiving panel having opposed sides, and more particularly having a visible side and a blind side, that address at least one of the above inconveniences.

SUMMARY

It is an object of the present technology to ameliorate at least some of the inconveniences present in the prior art.

According to one aspect of the present technology, there is provided an anchor assembly for insertion in a panel aperture in a receiving panel. The receiving panel has a first side and a second side opposite to the first side. The anchor assembly includes a flange having an engagement surface locatable on the first side of the receiving panel. The anchor assembly further includes a plurality of resilient arms projecting from the engagement surface of the flange. The plurality of resilient arms is insertable in the panel aperture upon inward deflection thereof. Each resilient arm has an outwardly facing tab structured and arranged for engaging the second side of the receiving panel so as to prevent removal of the anchor assembly from the panel aperture. At least two of the plurality of resilient arms define a channel therebetween for receiving a threaded fastener. The channel is sized so as to limit inward deflection of the at least two of the plurality of resilient arms when the threaded fastener extends within the channel. The anchor assembly further includes a threaded surface located in the flange. The threaded surface forms at least in part an anchor aperture for alignment with the panel aperture. The channel is aligned with the anchor aperture and extends from a top of the at least two of the plurality of resilient arms up to the anchor aperture. The threaded surface is located between the plurality of resilient arms and is adapted for threadingly engaging the threaded fastener.

In some implementations, the anchor assembly further includes a gasket disposed on the engagement surface of the flange.

In some implementations, the gasket covers the engagement surface of the flange entirely.

In some implementations, the gasket is overmolded on the engagement surface.

In some implementations, the anchor assembly further includes a body including the flange. The body defines a nut cavity. A nut is received in the nut cavity, and the nut defines the threaded surface.

In some implementations, the nut is a locknut including a deformable collar disposed adjacent to the threaded surface.

In some implementations, the deformable collar includes a polymer insert.

In some implementations, each one of the plurality of resilient arms has an inwardly protruding rib for abutting the threaded fastener when the threaded fastener extends within the channel.

In some implementations, the flange has an oblong shape defining a major axis and a minor axis.

In some implementations, the at least two of the plurality of resilient arms are disposed along the minor axis of the flange.

In some implementations, the at least two of the plurality of resilient arms are disposed on opposite sides of the major axis.

In some implementations, the at least two of the plurality of resilient arms is two resilient arms.

In some implementations, the tabs of the two resilient arms extend in opposite directions.

In some implementations, a distance between an outward tip of each tab is greater than a corresponding dimension of the panel aperture.

In some implementations, the anchor assembly further includes a plurality of guides projecting from the engagement surface of the flange between the plurality of resilient arms.

In some implementations, each one of the plurality of guides includes a guiding surface that tapers towards the anchor aperture for guiding the threaded fastener towards the anchor aperture.

In some implementations, the plurality of guides are structured and arranged to abut on a surface of the receiving panel defining the panel aperture so as to limit a rotation of the anchor assembly with respect to the receiving panel.

In some implementations, the flange has an oblong shape defining a major axis and a minor axis, and the plurality of guides are disposed along the major axis of the flange.

In some implementations, two of the plurality of guides are disposed on opposite sides of the minor axis.

In some implementations, the two of the plurality of guides have an asymmetric shape about the major axis of the flange.

In some implementations, the anchor assembly further includes the threaded fastener.

In some implementations, the anchor assembly further includes a circular knob extending from a side of the flange opposite to the engagement surface.

In some implementations, the circular knob defines a knob aperture in alignment with the anchor aperture.

According to another aspect of the present technology, there is provided a parts assembly including a first part having a first side and second side opposite to the first side, the first part defining a first aperture. The parts assembly further includes an anchor assembly received in the first aperture. The anchor assembly includes a flange having an engagement surface. The flange is disposed on the first side of the first part. The anchor assembly further includes a plurality of resilient arms projecting from the engagement surface of the flange. The plurality of resilient arms is inserted in the first aperture. Each resilient arm has an outwardly facing tab structured and arranged for engaging the second side of the first part so as to prevent removal of the anchor assembly from the first aperture, and at least two of the plurality of resilient arms defines a channel therebetween. The anchor assembly further includes a threaded surface located in the flange. The threaded surface forms at least in part an anchor aperture in alignment with the first aperture. The channel is aligned with the anchor aperture and extends from a top of the at least two of the plurality of resilient arms up to the anchor aperture. The threaded surface is located between the plurality of resilient arms. The parts assembly further includes a second part having a third side and a fourth side opposite to the third side. The third side faces the second side. The second part has a second aperture aligned with the anchor aperture. The parts assembly further includes a threaded fastener extending through the second aperture, the channel and the anchor aperture. The threaded fastener threadingly engages the threaded surface. The threaded fastener limits inward deflection of the at least two of the plurality of resilient arms. The threaded fastener and the anchor assembly together fasten the second part to the first part.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying figures and the appended claims.

BRIEF DESCRIPTION OF THE FIGURES

For a better understanding of the present technology, as well as other aspects and further features thereof, reference is made to the following description which is to be used in conjunction with the accompanying figures, where.

DETAILED DESCRIPTION

Referring to FIGS. 1 to 8, an anchor assembly 40 in accordance with a first implementation of the present technology will be described. The anchor assembly 40 is for insertion in a receiving panel 50 illustrated in FIGS. 9 to 18, which will be briefly described to aid in understanding the description of the anchor assembly 40 further below.

Figure 11:
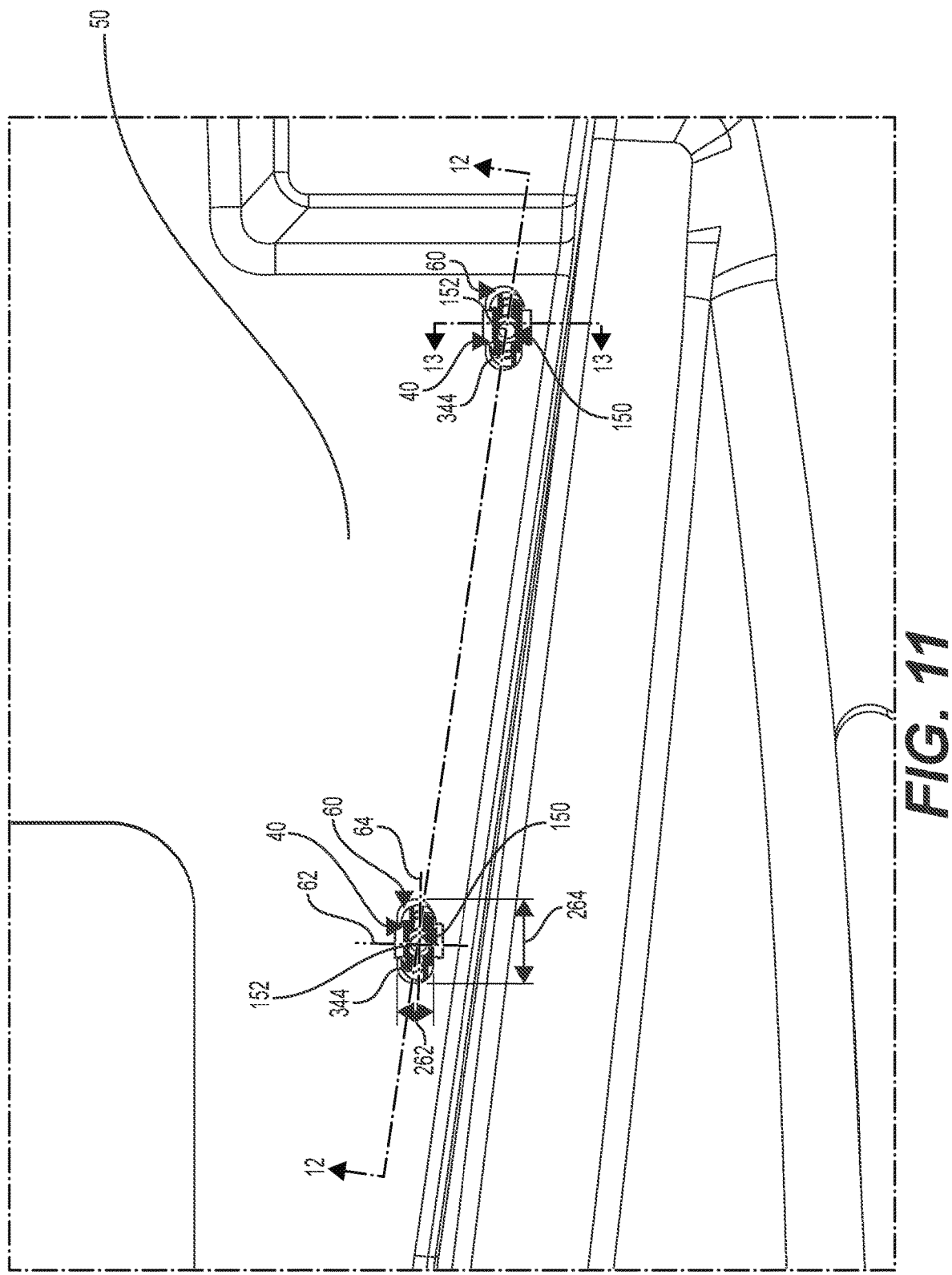
FIG. 11 is an enlarged view of portion 11 of the deck of FIG. 10.
Figure 12:
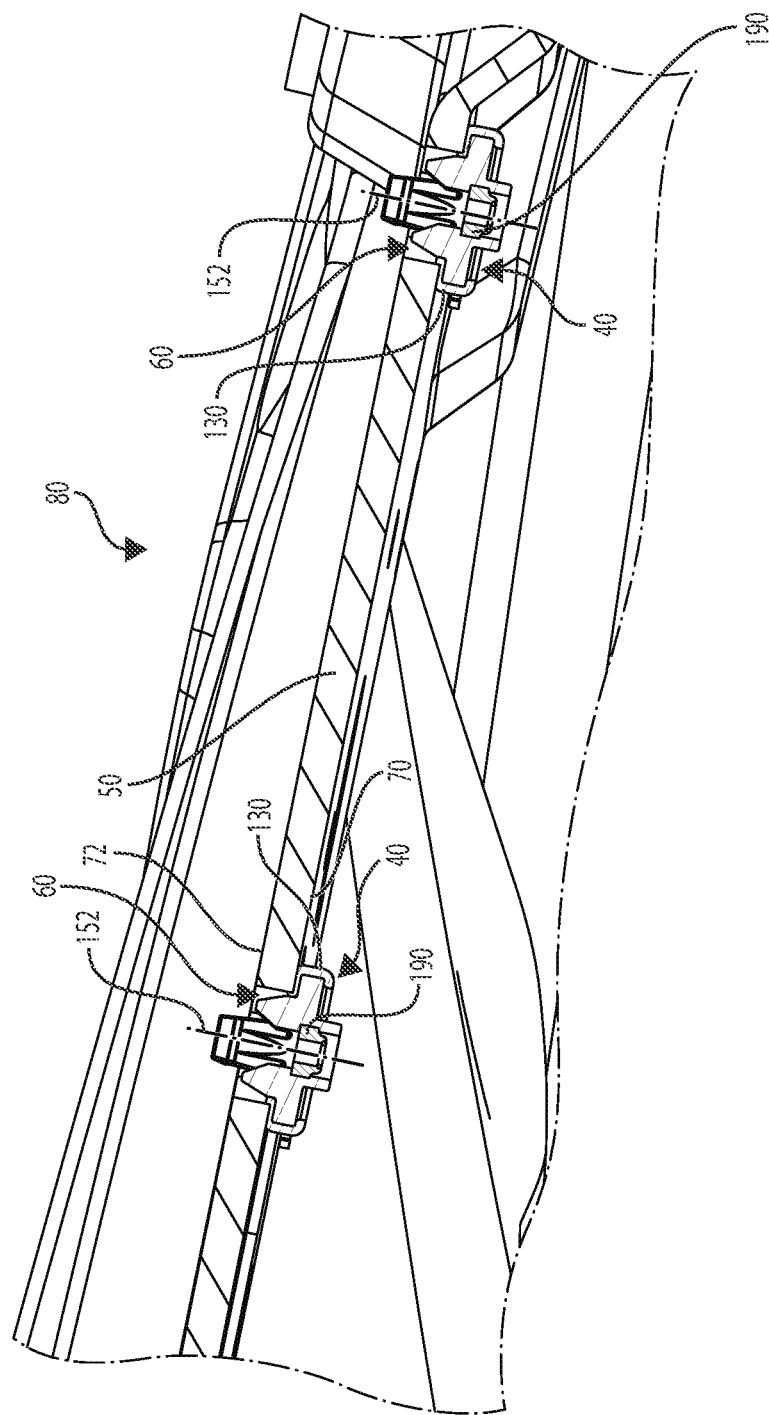
FIG. 12 is a cross-sectional view of the deck of FIG. 9 taken along cross-section line 12-12 of FIG. 11.
Figure 13:
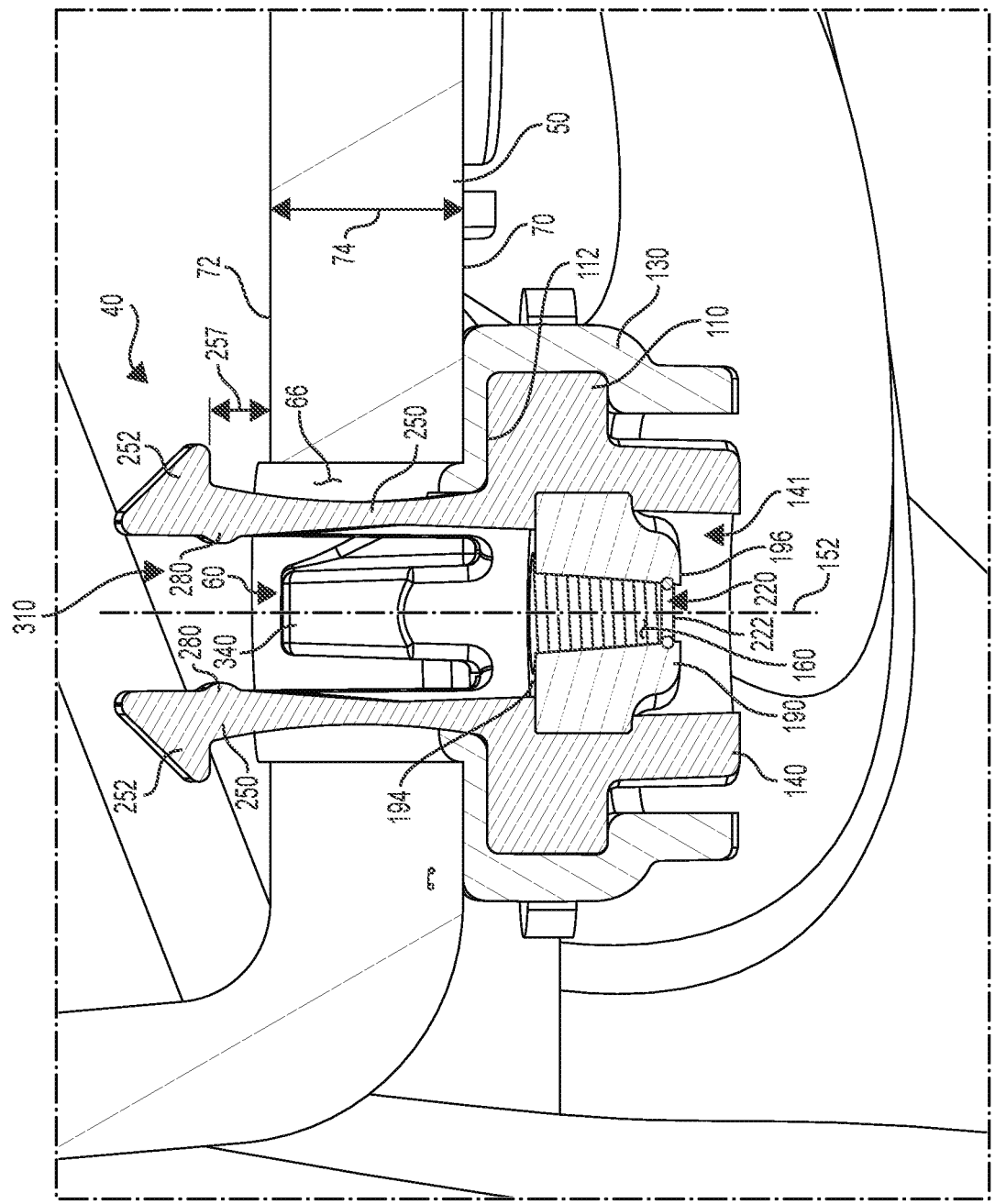
FIG. 13 is a cross-sectional view of the deck of FIG. 9 taken along cross-section line 13-13 of FIG. 11.
Figure 14:
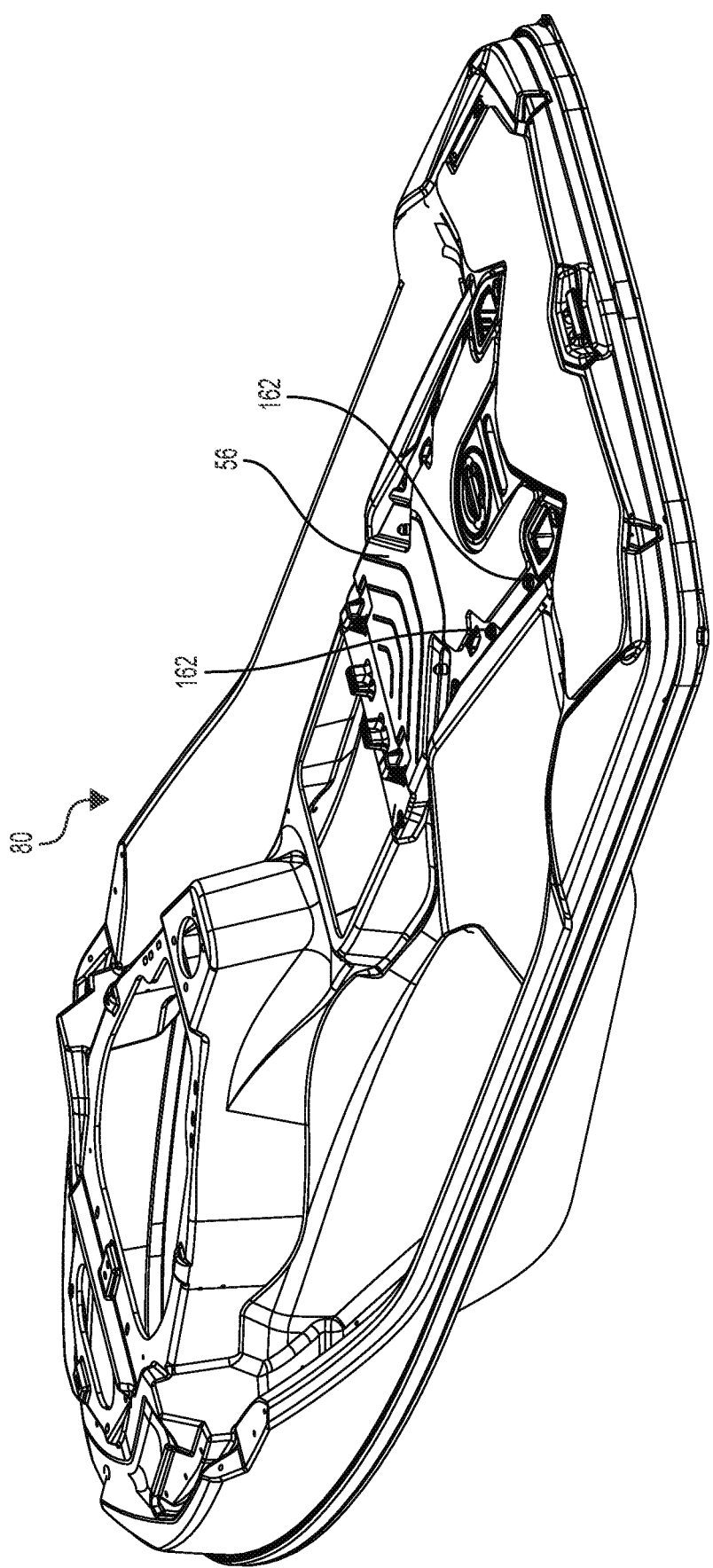
FIG. 14 is a perspective view taken from a rear, top, left side of the deck of FIG. 9, with a deck panel connected to the deck via fasteners and anchor assemblies in accordance with the implementation of FIG. 1.
Figure 15:
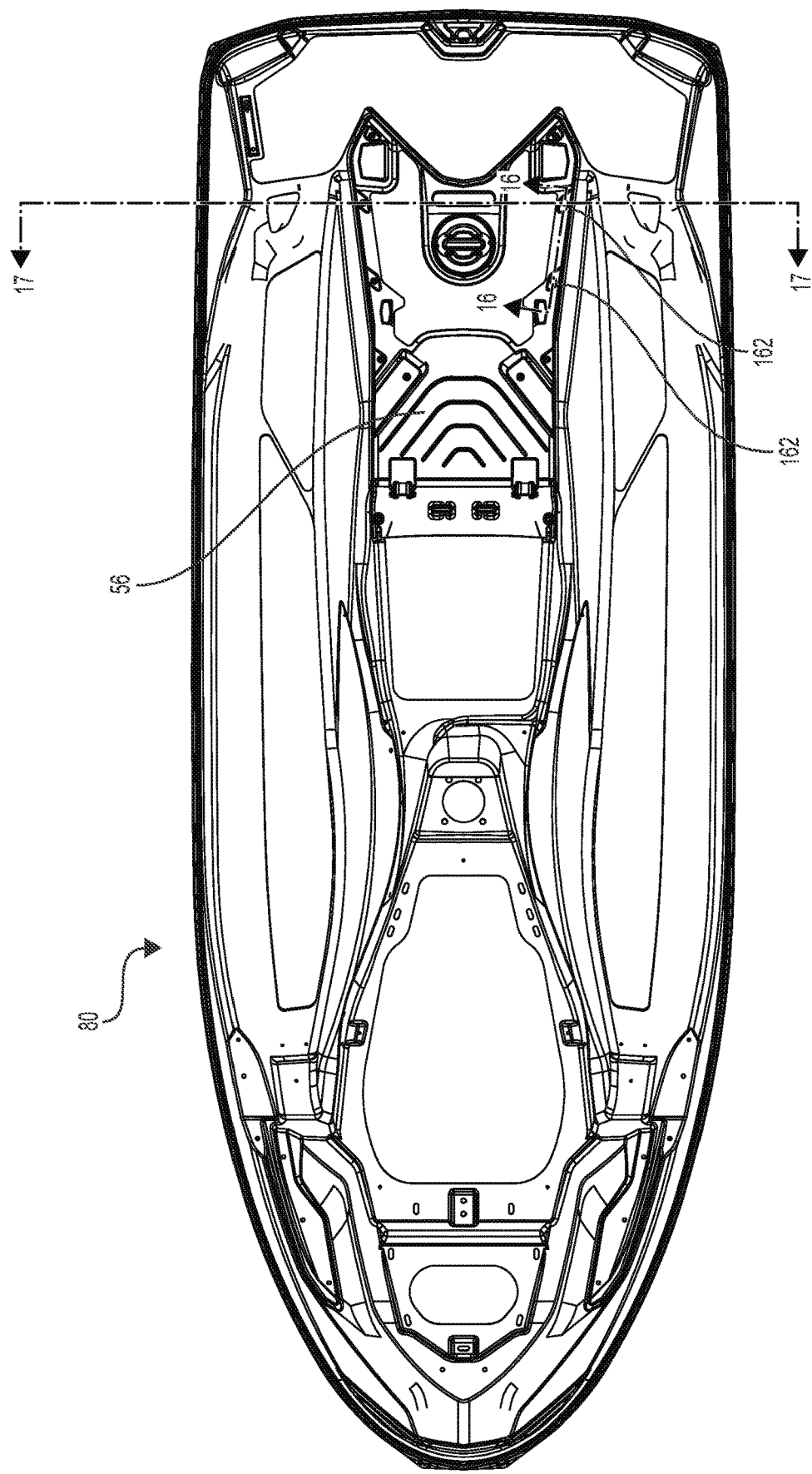
FIG. 15 is a top plan view of the deck and deck panel of FIG. 14.

Referring to FIGS. 9 to 13, the receiving panel 50 has a panel aperture 60 defined therein. The panel aperture 60 has an oblong shape having two straight sides and two rounded ends. The panel aperture 60 defines a minor axis 62 and a major axis 64 (FIG. 11). Referring to FIG. 13, the receiving panel 50 has a side 70, an opposite side 72, and a thickness 74 between the sides 70, 72. The panel aperture 60 is defined by a surface 66 extending between the sides 70, 72. For illustrative purposes, in the accompanying FIGS. 9 to 18, the receiving panel 50 is a portion of a deck 80 of a vehicle. The vehicle is a personal watercraft and only the deck 80 thereof is illustrated for clarity. It will be appreciated that, in some implementations, the deck of a watercraft may include multiple panels. The receiving panel 50 corresponds to a portion of the deck 80 that covers partially the engine compartment of the personal watercraft. As best shown in FIGS. 14 to 18, a deck panel 56 is connectable to the side 72 of the receiving panel 50 by fastening a plurality of threaded fasteners 162 that are part of a corresponding plurality of anchor assemblies 40 inserted in panel apertures 60 defined in the receiving panel 50. The deck 80 and the deck panel 56 are closed mold composite panels and the deck panel 56 is connectable to or removable from the receiving panel 50 for accessing the engine compartment of the personal watercraft.

In the accompanying Figures, the side 70 of the receiving panel 50 is a blind side, i.e. for which access is unavailable or difficult. In contrast, the side 72 of the receiving panel 50 is a visible side, i.e. for which access is available. Although the anchor assembly 40 is suited to be used with a panel or other component having a blind side, it is contemplated that the anchor assembly 40 could be used on a panel or other component having two sides for which access is available.

Figure 1:
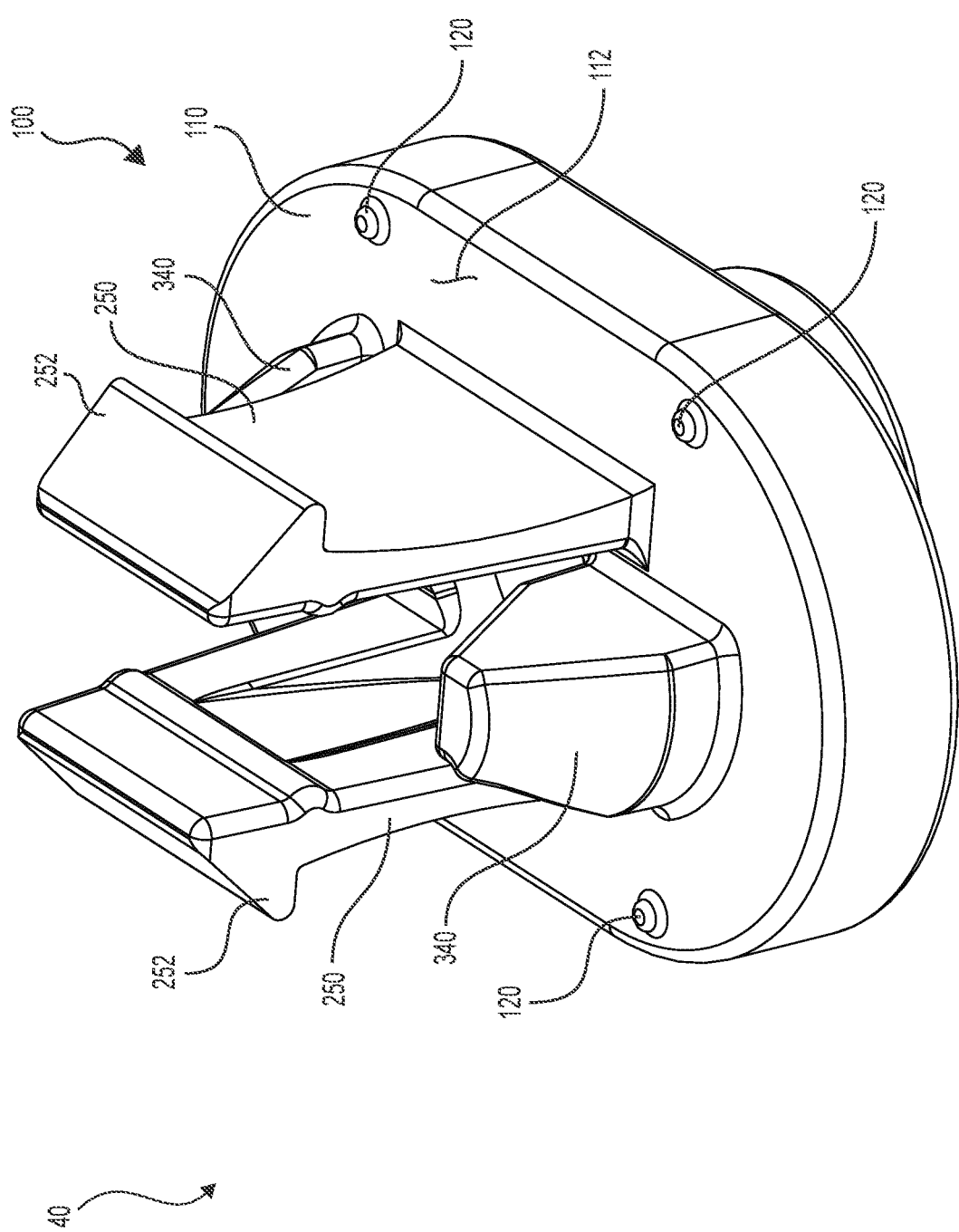
FIG. 1 is a perspective view taken from a front, top, left side of an anchor assembly in accordance with a first implementation the present technology, with a gasket omitted.
Figure 2:
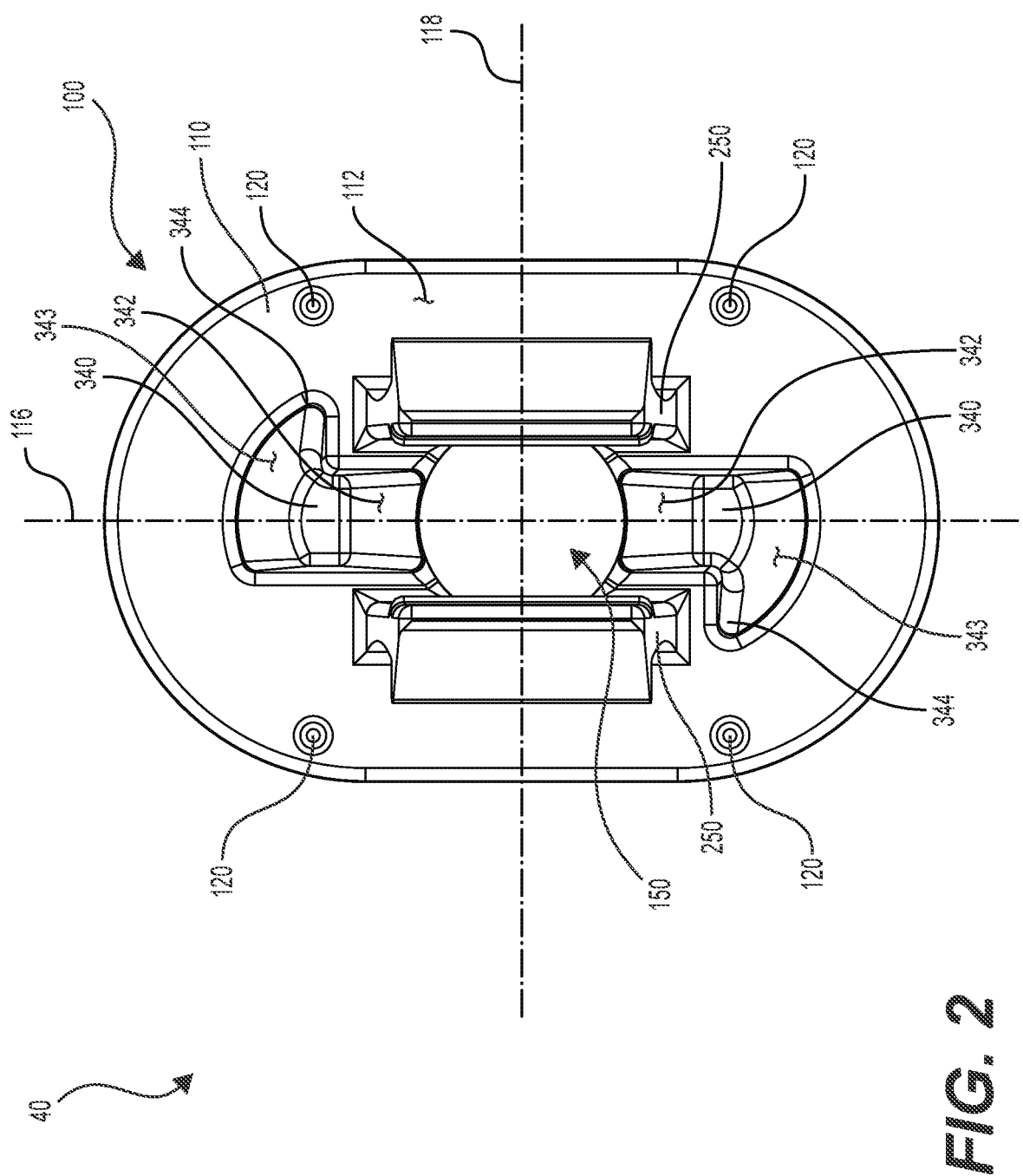
FIG. 2 is a top plan view of the anchor assembly of FIG. 1.
Figure 6:
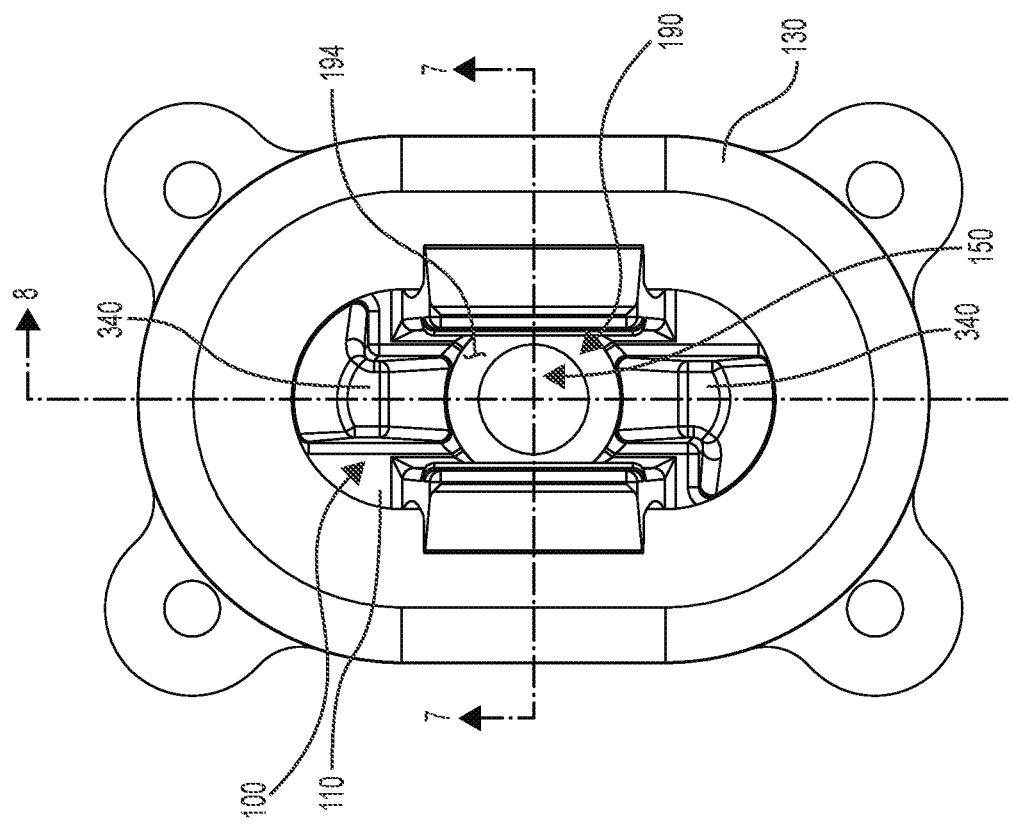
FIG. 6 is a top plan view of the anchor assembly of FIG. 3.
Figure 6:
Figure 7:
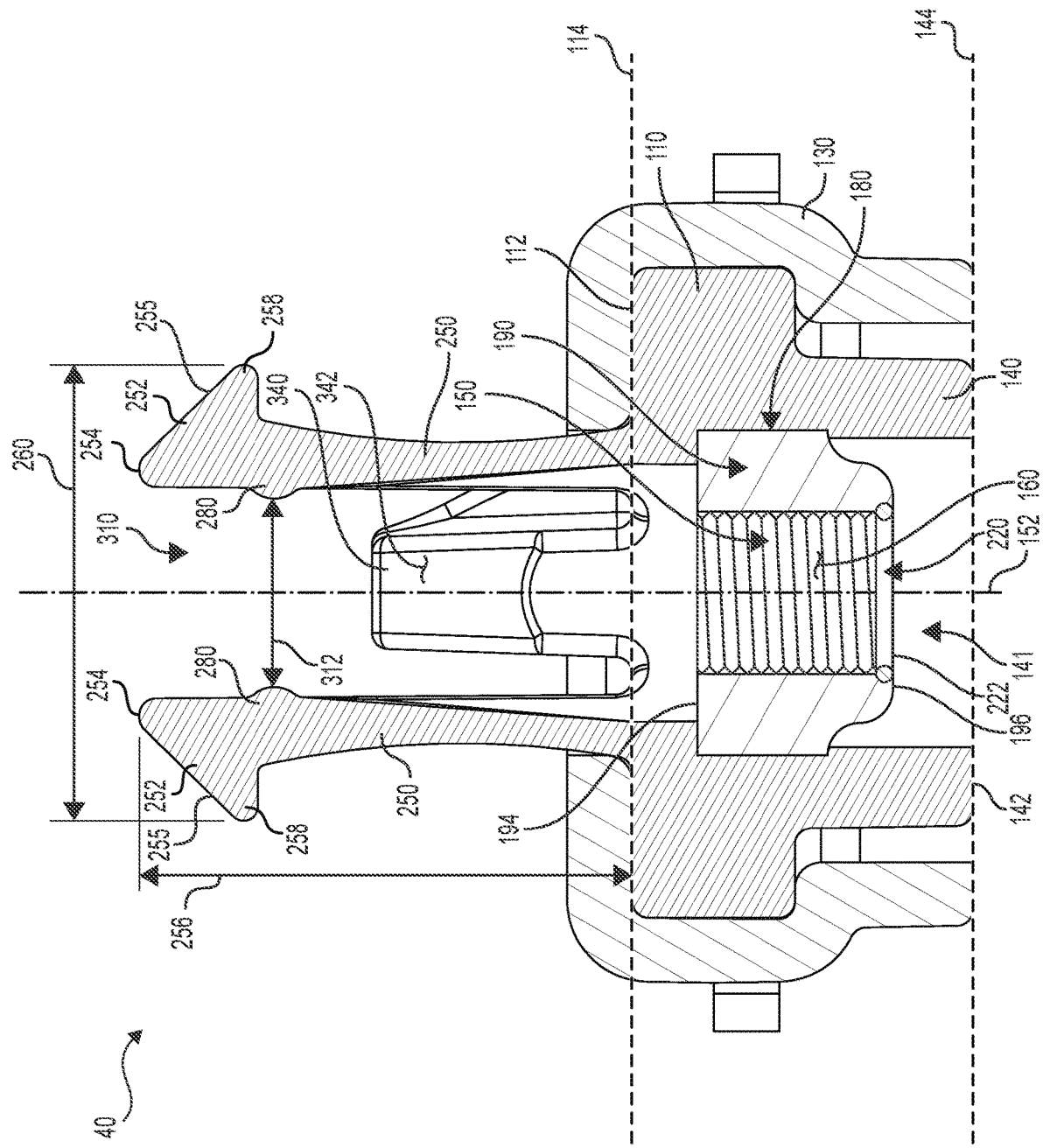
FIG. 7 is a cross-sectional view of the anchor assembly of FIG. 6 taken along cross-section line 7-7 of FIG. 6.
Figure 8:
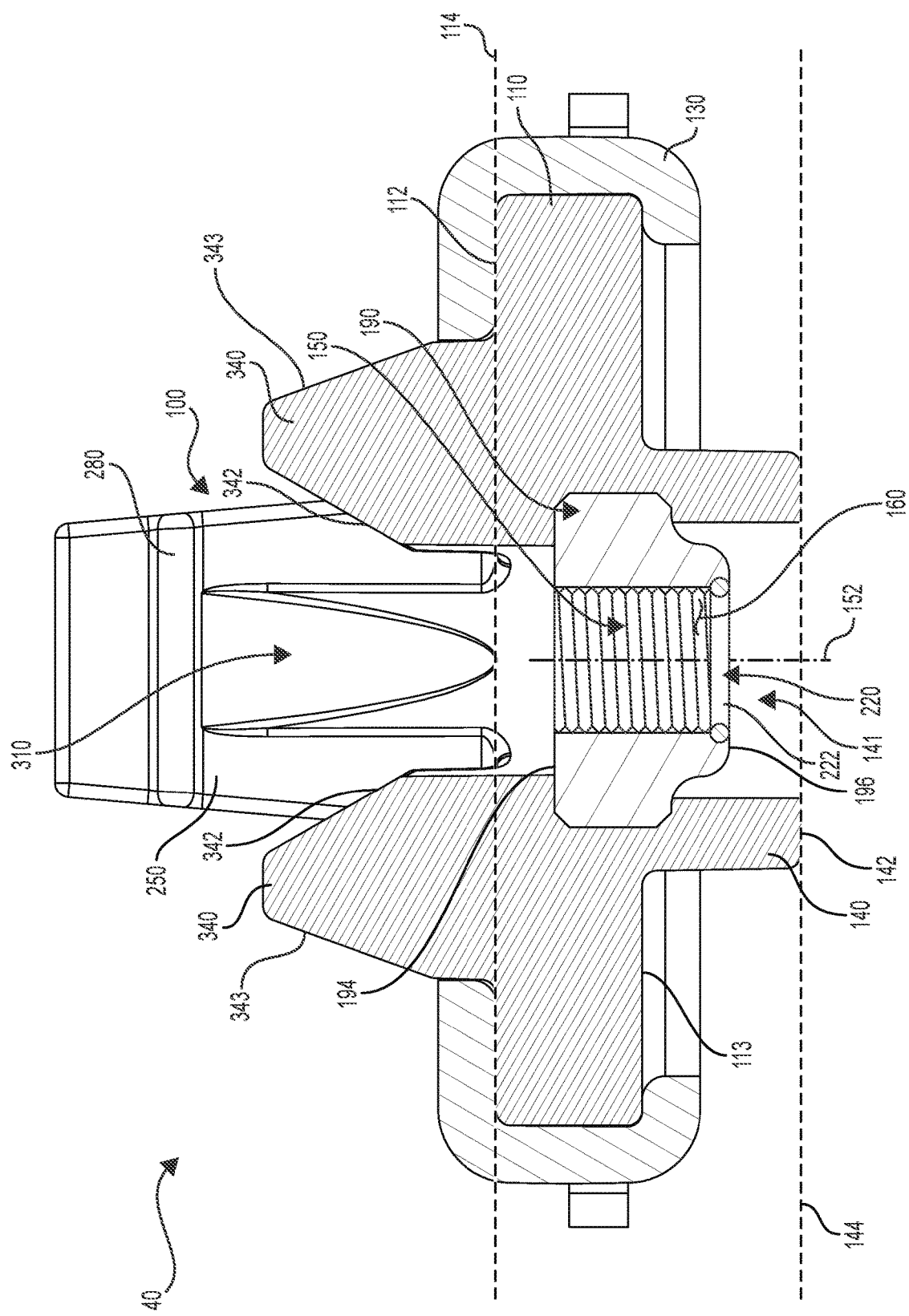
FIG. 8 is a cross-sectional view of the anchor assembly of FIG. 6 taken along cross-section line 8-8 of FIG. 6.
Figure 9:
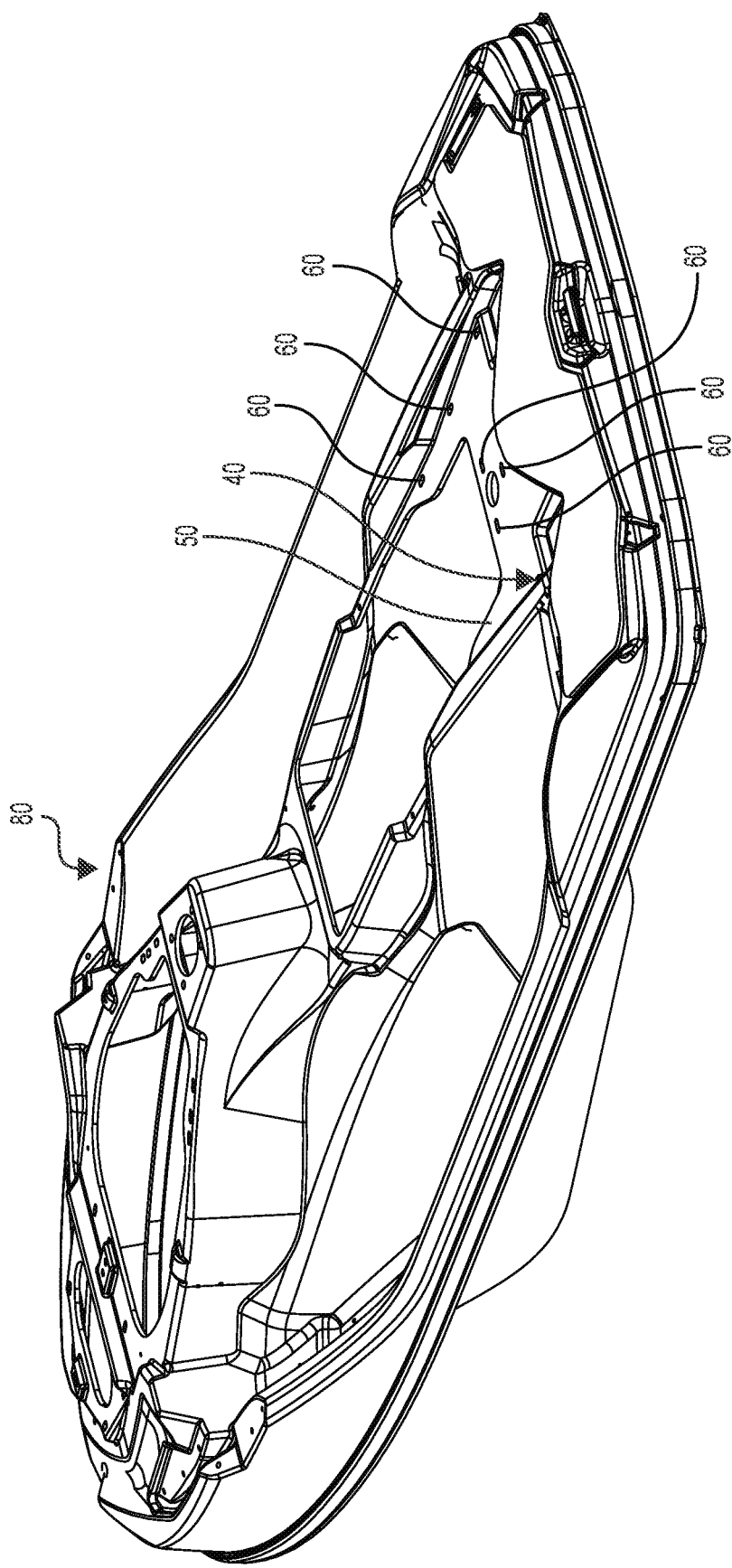
FIG. 9 is a perspective view taken from a rear, top, left side of a deck of a personal watercraft, with anchor assemblies in accordance with the implementation of FIG. 3 inserted in apertures of the deck.
Figure 10:
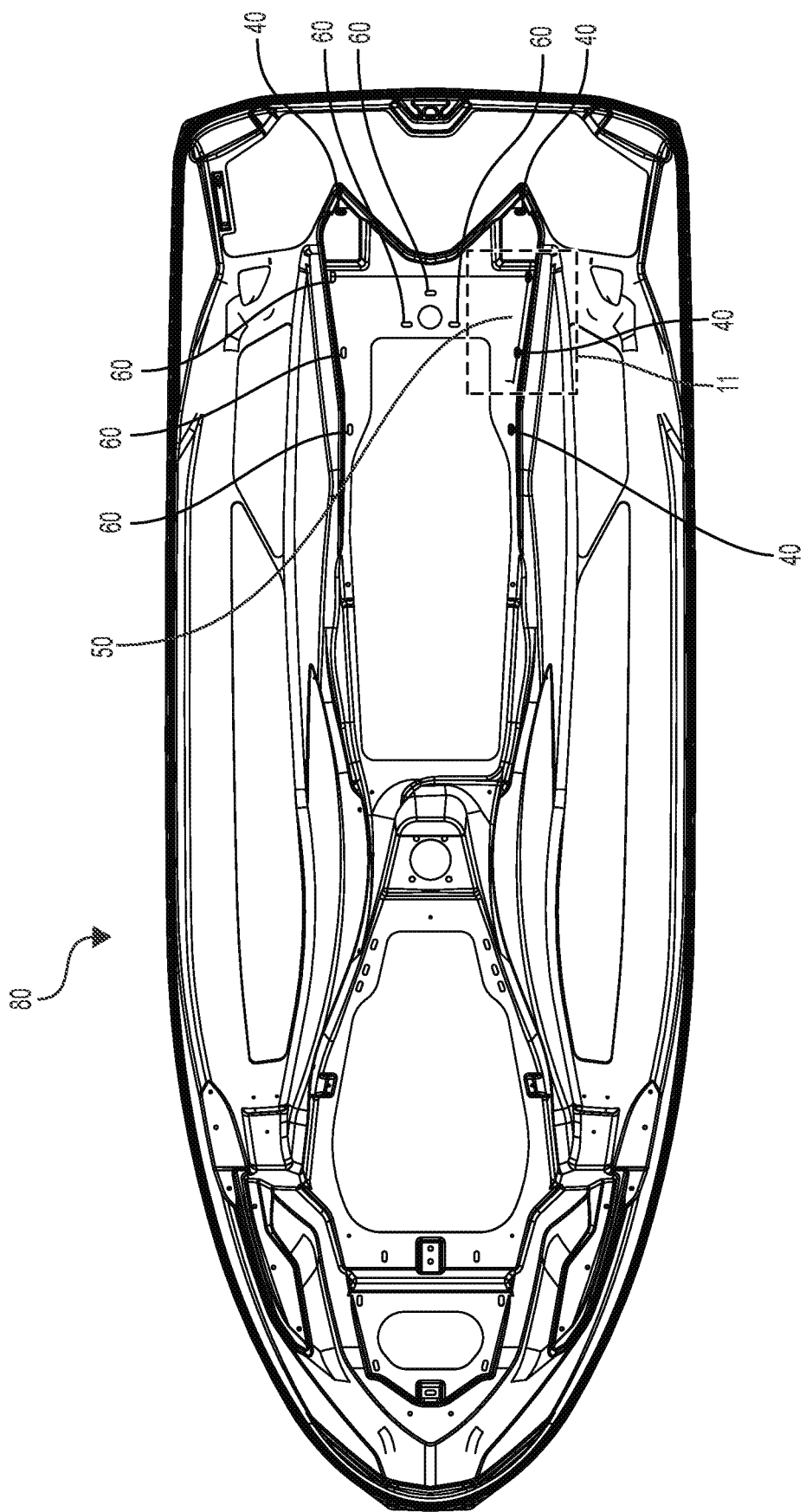
FIG. 10 is a top plan view of the deck of FIG. 9.

Referring back to FIGS. 1 to 8, the anchor assembly 40 will be described in more detail. The anchor assembly 40 has a body 100. The body 100 is made of molded polymeric material, but could be made of other materials. The body 100 has a flange 110. The flange 110 has an engagement surface 112. The engagement surface 112 is locatable on the blind side 70 of the receiving panel 50 when the anchor assembly 40 is in use. Like the panel aperture 60, the flange 110 has an oblong shape having two straight sides and two rounded ends. The oblong shape of the flange 110 defines a major axis 116 and a minor axis 118 (FIG. 2). The flange 110 is dimensioned such that the engagement surface 112 has at least one dimension that is larger than a corresponding dimension of the panel aperture 60. In the present implementation, the flange 110 is longer along its major axis 116 than the panel aperture 60 along its major axis 64 (FIG. 11), and the flange 110 is wider along its minor axis 118 than the panel aperture 60 along its minor axis 62 (FIG. 11). The flange 110 could have other shapes and/or dimensions in other implementations. It is contemplated that the flange 110 could have a shape that differs from the shape of the panel aperture 60. The engagement surface 112 defines a plane 114 (FIGS. 7 and 8). Four protrusions 120 project from the engagement surface 112.

The anchor assembly 40 further includes a gasket 130. The gasket 130 is made of a resilient polymeric material, such as a rubber- or silicon-based material. The gasket 130 is stretched and fitted over the flange 110 so as to sit on the engagement surface 112 and cover at least partially all the sides of the flange 110. The gasket 130 covers the engagement surface 112 entirely, but could be shaped and dimensioned otherwise in other implementations. The gasket 130 permits a sealed connection between the anchor assembly 40 and the blind side 70 of the receiving panel 50 when the anchor assembly 40 is in use. The protrusions 120 engage the gasket 130 and help maintain the gasket 130 in place on the engagement surface 112. Ears 132 extend laterally outwardly of the four rounded corners of the gasket 130. The ears 132 are formed during the manufacturing process of the gasket 130. The gasket 130 further has downwardly extending tabs 134. The tabs 134 permits grasping of the anchor assembly 40, and may facilitate handling of the anchor assembly 40 when the anchor assembly 40 is inserted in or removed from the panel aperture 60. The gasket 130 could be omitted in some implementations, and in such implementations, the engagement surface 112 could engage directly the blind side 70 of the receiving panel 50 when the anchor assembly 40 is in use.

Figure 5:
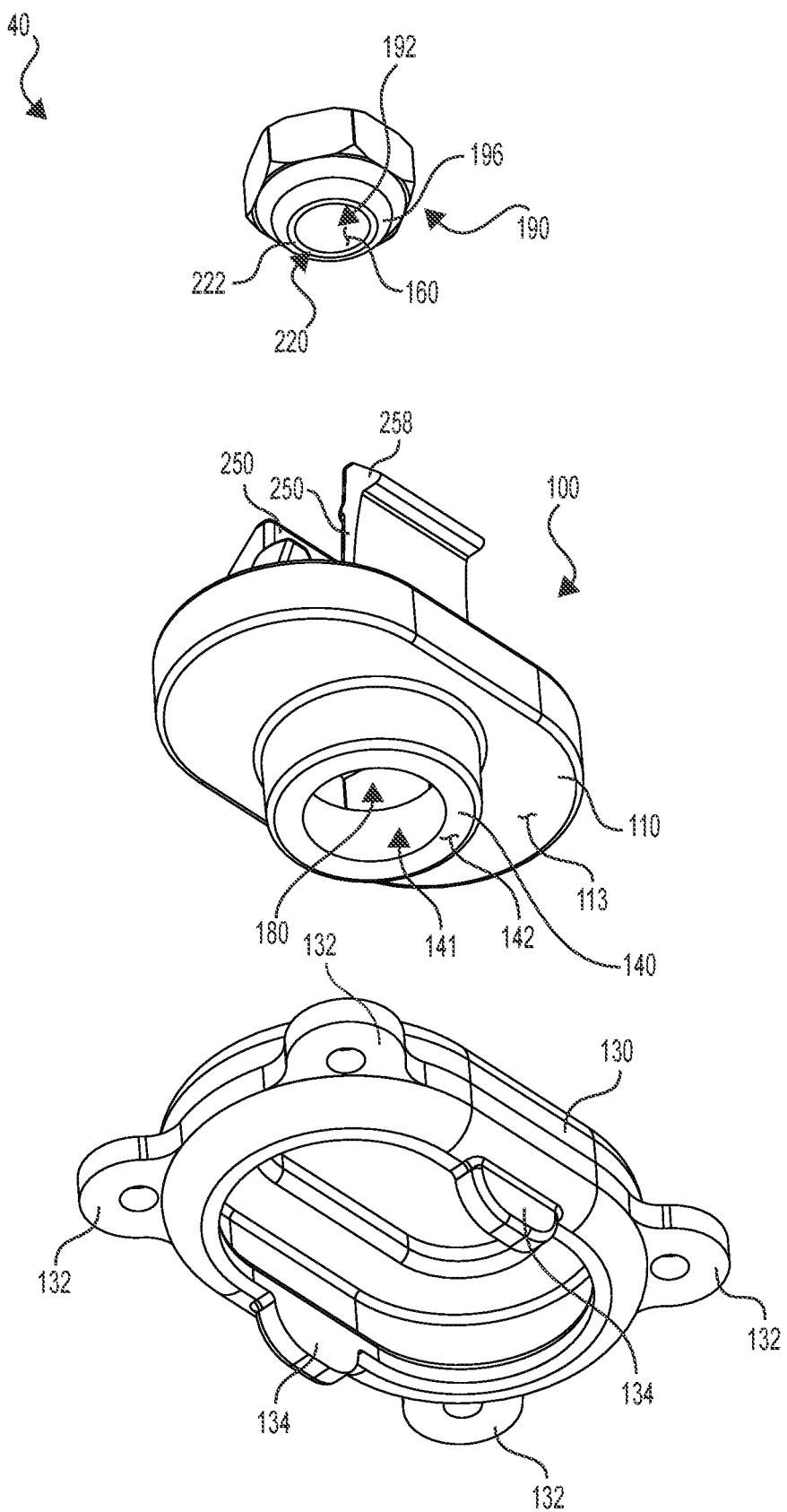
FIG. 5 is an exploded perspective view taken from a front, bottom, left side of the anchor assembly of FIG. 3.

Referring to FIGS. 5, 7 and 8, the anchor assembly 40 further includes a circular knob 140 extending downwardly of a side 113 of the flange 110. The side 113 is opposite to the engagement surface 112. The knob 140 permits grasping of the anchor assembly 40, and may facilitate handling of the anchor assembly 40 when the anchor assembly 40 is inserted in or removed from the panel aperture 60. The knob 140 is cylindrically shaped and defines part of a body aperture 141. The knob 140 has a bottom face 142 defining a plane 144. The plane 144 extends parallel to the plane 114 and below the plane 114 in the accompanying Figures.

Referring to FIGS. 1 to 8, the flange 110 forms part of an anchor aperture 150 defined in the anchor assembly 40. As such, the anchor aperture 150 is part of the anchor assembly 40, and the anchor aperture 150 extends within the body aperture 141, which is part of the body 100. The flange 110 is shaped and dimensioned such that the anchor aperture 150 is aligned with the panel aperture 60 and the body aperture 141 along an axis 152 (FIGS. 7, 8, 11 and 12). The anchor aperture 150 extends between the plane 114 and the plane 144. Referring to FIGS. 7 and 8, a threaded surface 160 forms part of the anchor aperture 150. The threaded surface 160 is located in the flange 110. The threaded surface 160 is cylindrical and is coaxially aligned with the axis 152. The threaded surface 160 is located between the plane 114 and the plane 144. The threaded surface 160 is adapted for threadingly engaging one of the plurality of threaded fasteners 162 (FIG. 18) mentioned above. In the present implementation, the fastener 162 is a bolt, but the fastener 162 could be a screw in some implementations. As such, the anchor aperture 150 is shaped so as to receive the fastener 162 therein.

Referring to FIGS. 5, 7 and 8, the body 100 of the anchor assembly 40 defines a nut cavity 180. A nut 190 is received within the nut cavity 180. The nut 190 is received in the body aperture 141. The nut 190 is held in the body 100 between the planes 114, 144. More particularly, the body 100 is overmolded on the nut 190. The nut 190 is positioned such that its hole 192 is in alignment with the axis 152 of the anchor aperture 150. The nut 190 has a top face 194 and a bottom 196 face (FIGS. 6 to 8). In the present implementation, the nut 190 defines the threaded surface 160 entirely. More particularly, the nut 190 is a locknut that has a deformable collar 220 (FIGS. 5, 7 and 8) disposed adjacent to the threaded surface 160. The deformable collar 220 includes a polymer insert 222. The collar 220 is deformable by the mating thread of the fastener 162 when threadingly engaged thereto. In some implementations, the polymer insert 222 is made of nylon. It is contemplated that an adhesive could also be provided between the fastener 162 and the threaded surface 160 to prevent loosening of the connection provided by the anchor assembly 40. In another implementation, the nut cavity 180 and the nut 190 are omitted, and the threaded surface 160 is defined directly within the body 100 of the anchor assembly 40. In such an implementation, the threaded surface 160 could be defined by tapping the body aperture 141, which would then correspond to the anchor aperture 150.

Referring back to FIGS. 1 to 8, the anchor assembly 40 further includes two resilient arms 250. The resilient arms 250 project upwardly of the engagement surface 112 of the flange 110. As best seen in FIG. 2, the two resilient arms 250 are disposed along the minor axis 118 of the flange 110, and on opposite sides of the major axis 116. The resilient arms 250 are insertable in the panel aperture 60 of the receiving panel 50 upon inward deflection thereof, i.e. deflected towards each other. In some implementations, the anchor assembly 40 could include more than two resilient arms 250. As best seen in FIGS. 7 and 8, the threaded surface 160 is located between the two resilient arms 250.

Each resilient arm 250 has an outwardly facing tab 252. Each tab 252 is located between a top 254 of the corresponding resilient arm 250 and the engagement surface 112 of the flange 110. The tabs 252 extend in opposite directions. The resilient arms 250 have a length 256 (FIG. 7) that is greater than the thickness 74 of the receiving panel 50. Each tab 252 has an inclined surface 255 for engaging the rim of the panel aperture 60 and the surface 66 of the receiving panel 50 when the corresponding resilient arm 250 is inserted in the panel aperture 60. As such, when the anchor assembly 40 is pushed through the panel aperture 60, the resilient arms 250 deflect inwardly.

Figure 18:
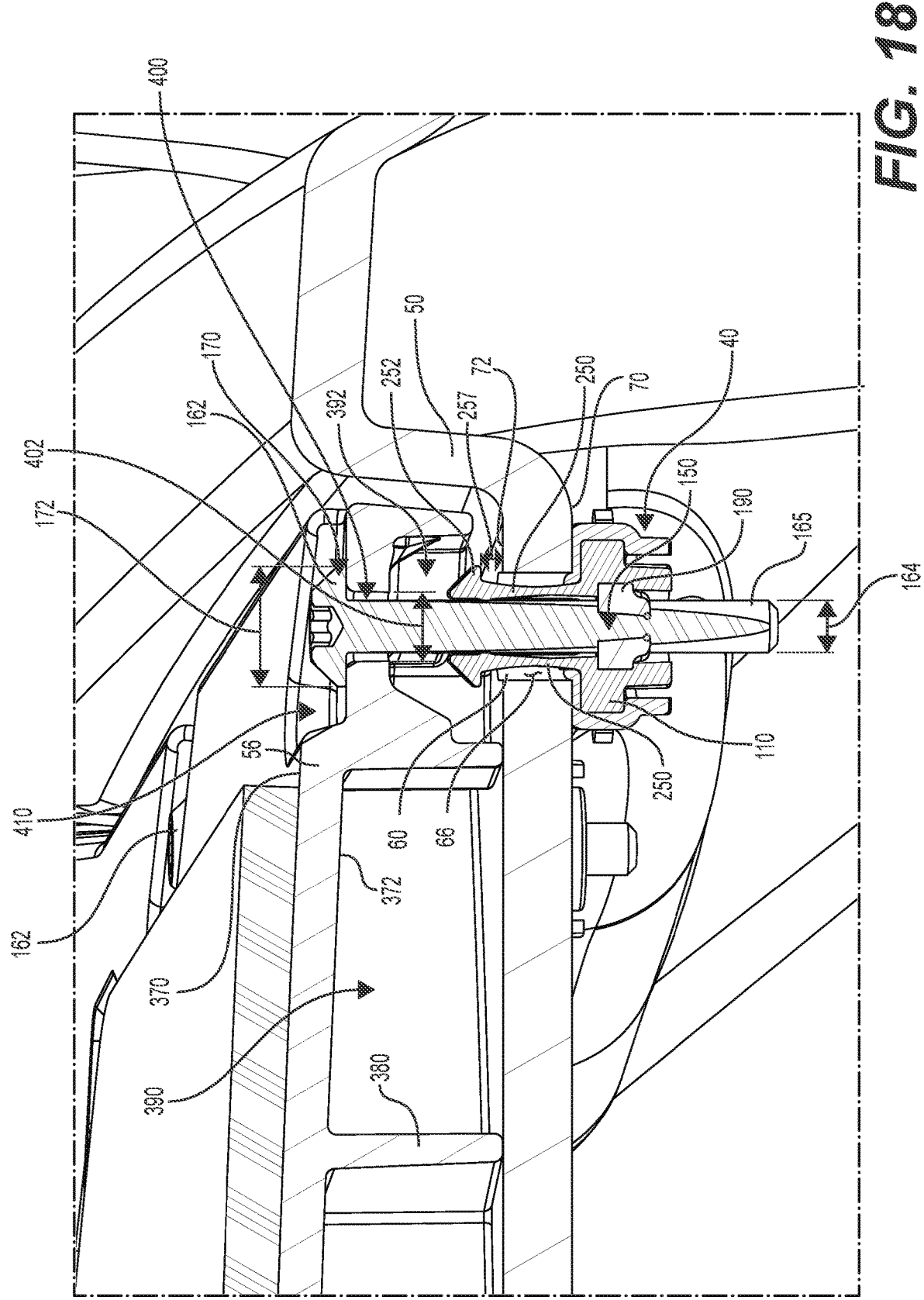
FIG. 18 is an enlarged view of portion 18 of the deck and deck panel of FIG. 17.
Figure 19:
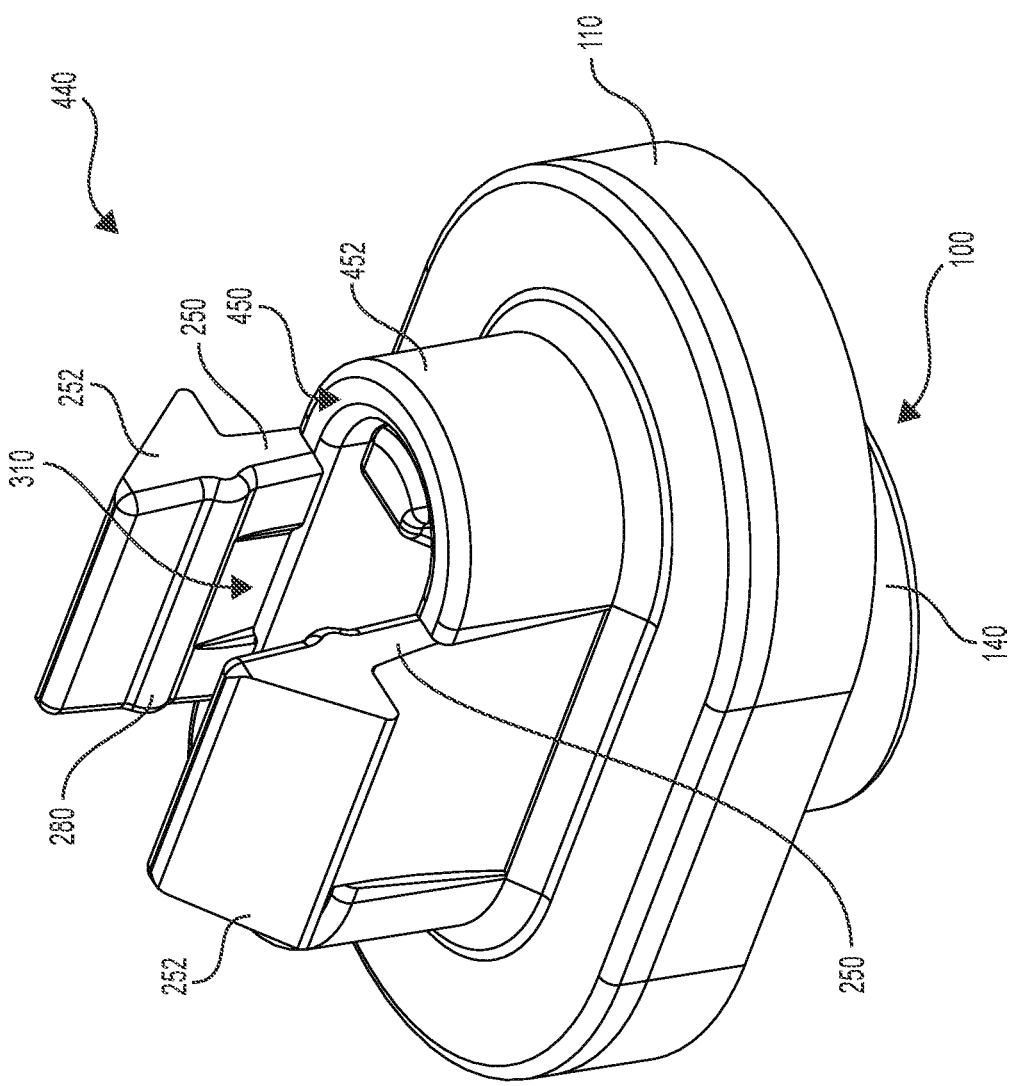
FIG. 19 is perspective view taken from a front, top, right side of an anchor assembly in accordance with a second implementation of the present technology.

Referring to FIGS. 13 and 18, after the resilient arms 250 have been inserted in the panel aperture 60, the tabs 252 extend on the visible side 72 of the receiving panel 50. Each tab 252 is structured and arranged for engaging the visible side 72 in order to prevent removal of the anchor assembly 40 from the panel aperture 60. It is to be noted that the anchor assembly 40 is only loosely retained to the receiving panel 50 before the component to be fastened, in this case the deck panel 56, and the fastener 162 is inserted into the anchor aperture 150, engages the threaded surface 160 and causes the engagement surface 112 of the flange 110 and the gasket 130 to be moved toward the blind side 70 of the receiving panel 50. Prior to the insertion of the fastener 162 into the anchor aperture 150, a receiving panel 50 with one or more anchor assemblies 40 connected thereto can be manipulated without inadvertent removal of the anchor assemblies 40. Similarly, prior to the insertion of the fastener 162, the anchor assembly 40 can be removed from the panel aperture 60 by inwardly deflecting the resilient arms 250, and pulling the anchor assembly 40 away from the blind side 70 of the receiving panel 50 and out of the panel aperture 60.

Still referring to FIGS. 7, 13 and 18, the length 256 of the resilient arms 250 and the arrangement of the tabs 252 are selected such that there remains a gap 257 between the tabs 252 and the visible side 72 after the fastener 162 has threadingly engaged the threaded surface 160. In other implementations, the length 256 of the resilient arms 250 and the arrangement of the tabs 252 could be selected such that there remains no gap between the tabs 252 and the visible side 72.

Referring to FIGS. 4, 5, 7 and 11, each tab 252 has an outward tip 258. A distance 260 between the outward tips 258 of the tabs 252 is greater than a corresponding dimension 262 (FIG. 11) of the panel aperture 60 extending along the minor axis 62 of the panel aperture 60. The distance 260 is also shorter than a dimension 264 (FIG. 11) extending along the major axis 64 of the panel aperture 60.

Figure 3:
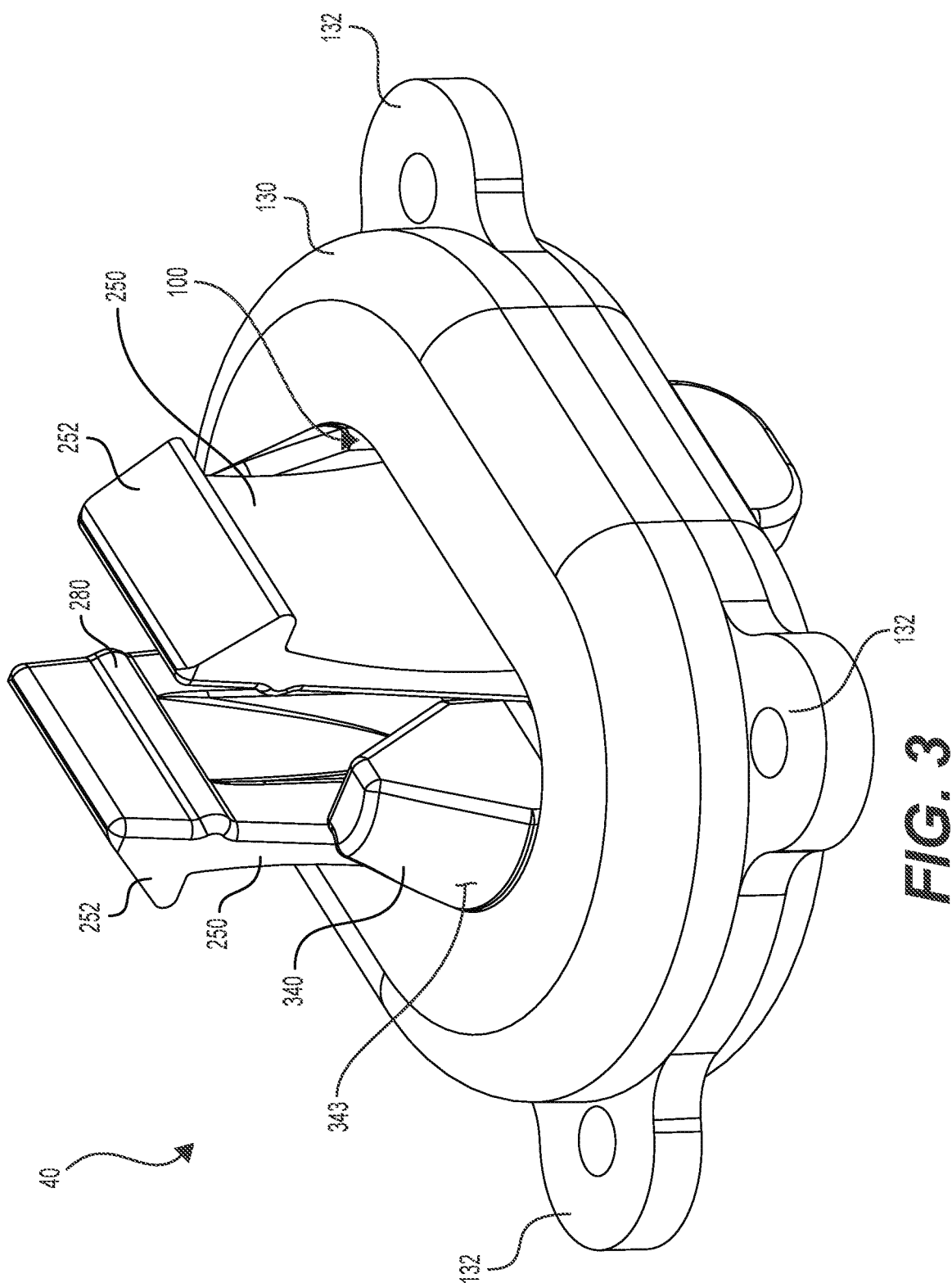
FIG. 3 is a perspective view taken from a front, top, left side of the anchor assembly of FIG. 1, including the gasket.
Figure 4:
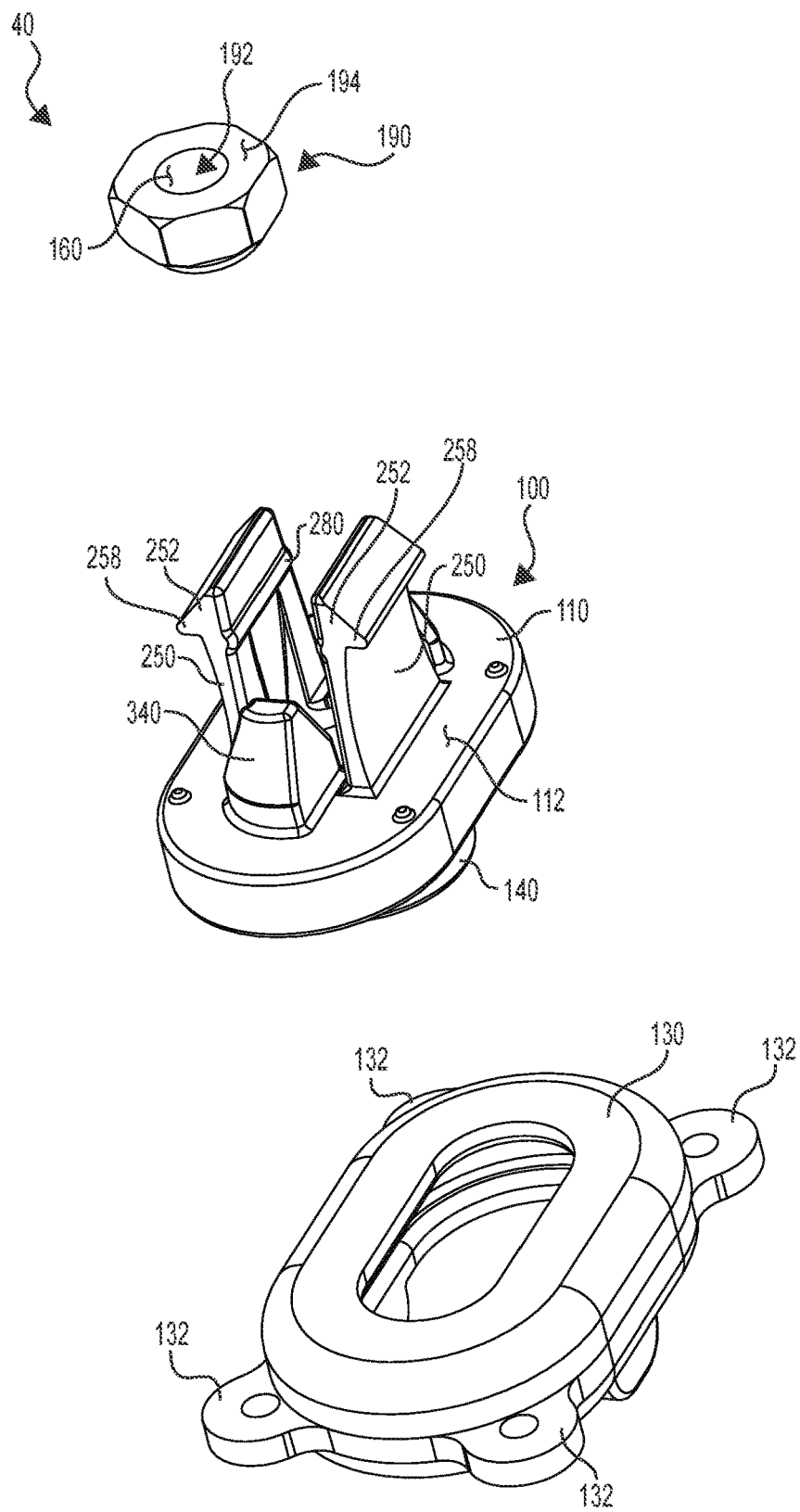
FIG. 4 is an exploded perspective view taken from a front, top, left side of the anchor assembly of FIG. 3.

Referring to FIGS. 3, 4 and 7, each resilient arm 250 has an inwardly protruding rib 280. The ribs 280 extend parallel to the major axis 116 of the flange 110, between the top 254 of the resilient arms 250 and the plane 114. The ribs 280 also extend on the side of the resilient arm 250 that is opposite to the tip 258 of the tab 252. Referring to FIG. 7, the two resilient arms 250 define a channel 310 extending therebetween. The channel 310 is aligned with the axis 152. The channel 310 extends from the top 254 of the resilient arms 250 up to the anchor aperture 150. The channel 310 is sized so as to limit the inward deflection of the two resilient arms 250 when the fastener 162 extends within the channel 310. More particularly, the channel 310 has a width 312 that corresponds to the distance between the protruding ribs 280 of the resilient arms 250. As seen in FIG. 18, the inwardly protruding ribs 280 are arranged for abutting on the fastener 162 when the fastener 162 extends within the channel 310 and, as such, the width 312 is smaller or equal to a diameter 164 of a shank 165 of the fastener 162. In other implementations, the width 312 could be larger than the diameter 164 of the shank 165 of the fastener 162 as long as the resilient arms 250 are prevented from inwardly deflecting when the fastener 162 extends within the channel 310 to the point that the distance 260 becomes less than the dimension 262 of the panel aperture 60. In implementations where the width 312 is smaller than the diameter 164 of the shank 165 of the fastener 162, the two resilient arms 250 are outwardly deflected when the fastener 162 extends within the channel 310. The ribs 280 and the tabs 252 are arranged such that, when the ribs 280 abut the fastener 162, the tabs 252 will engage the visible side 72 of the receiving panel 50, provided that the fastener 162 has not been tightened yet and that the anchor assembly 40 is still loosely retained to the receiving panel 50.

Referring to FIGS. 1 to 8, the anchor assembly 40 further includes two guides 340 that are shaped to ease alignment and assembly of the anchor assembly 40 and connection of the panels 50, 56. The guides 340 project upwardly of the engagement surface 112 of the flange 110. The guides 340 extend between the two resilient arms 250 along the major axis 116 of the flange 110, and on opposite sides of the minor axis 118. The guides 340 are vertically below the tabs 252 of the resilient arms 250. In some implementations, the anchor assembly 40 could include more than two guides 340.

Referring to FIGS. 7 and 8, each guide 340 has a fastener guiding surface 342. Each fastener guiding surface 342 tapers towards the anchor aperture 150. As the fastener 162 is inserted into the channel 310, the shank 165 of the fastener 162 is guided towards the anchor aperture 150 by the fastener guiding surfaces 342. Each guide 340 also has an assembly guiding surface 343 (FIG. 2) located opposite to the fastener guiding surface 342. Each assembly guiding surface 343 tapers laterally outwards. As the anchor assembly 40 is inserted into the panel aperture 60, the assembly guiding surface 343 aids in properly aligning the anchor assembly 40 along the major axis 64 of the panel aperture 60.

Referring to FIGS. 2, 7 and 8, the guides 340 have an asymmetrical shape about the major axis 116. Each guide 340 is also structured and arranged to abut on the surface 66 of the receiving panel 50 when the anchor assembly 40 is inserted in the panel aperture 60. As the fastener 162 is screwed into the nut 190, the anchor assembly 40 undergoes a clockwise torque with respect to the receiving panel 50. At the same time, the guides 340 are drawn upwards into the panel aperture 60 and a tapering edge portion 344 (FIGS. 2 and 11) of each guide 340 abuts a rim of the panel aperture 60 and the surface 66, and forces the anchor assembly 40 in a counter-clockwise direction. The anchor assembly 40 thus keeps generally the same orientation with respect to the receiving panel 50 while the fastener 162 engages the threaded surface 160 and the deformable collar 220, and after the fastener 162 has been tightened to its final position. As a result, under certain circumstances, there is no need to hold the anchor assembly 40 on the blind side 70 of the receiving panel 50 while engaging and tightening the fastener 162 thereto.

Referring now to FIGS. 9 to 18, the connection of the deck panel 56 to the receiving panel 50 using a plurality of anchor assemblies 40 will be described in further detail. As shown in FIGS. 9 to 13, each anchor assembly 40 is first inserted in a corresponding panel aperture 60 of the receiving panel 50. As described above, in order to insert one of the anchor assemblies 40 in a corresponding panel aperture 60, (i) the body 100 of the anchor assembly 40 is positioned on the blind side 70 of the receiving panel 50 and in alignment with the corresponding panel aperture 60, (ii) the top 254 of each resilient arm 250 is inserted in the panel aperture 60 such that the inclined surfaces 255 of the tabs 252 abut the surface 66, and (iii) the anchor assembly 40 is pushed towards the panel aperture 60 so as to resiliently deflect the resilient arms 250 inwardly until the tabs 252 exit the panel aperture 60 and revert back to their rest position so as to engage the visible side 72 of the receiving panel 50. The anchor assembly 40 is then loosely retained to the receiving panel 50. These steps (i), (ii), and (iii) are repeated for each one of the anchor assemblies 40. It is contemplated that a part or component could be connected using a single anchor assembly 40.

Figure 16:
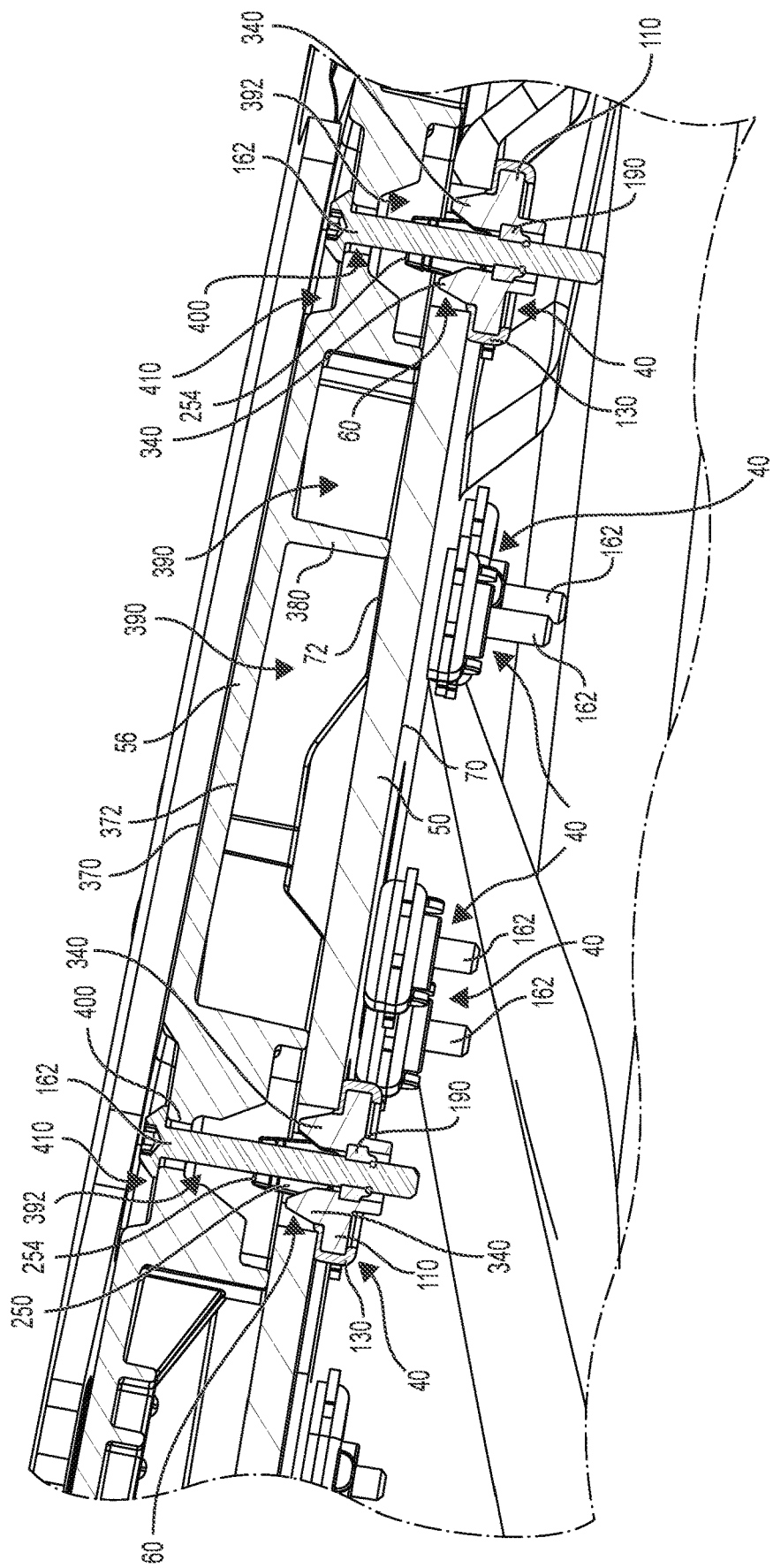
FIG. 16 is a cross-sectional view of the deck and deck panel of FIG. 14 taken along cross-section line 16-16 of FIG. 15.
Figure 17:
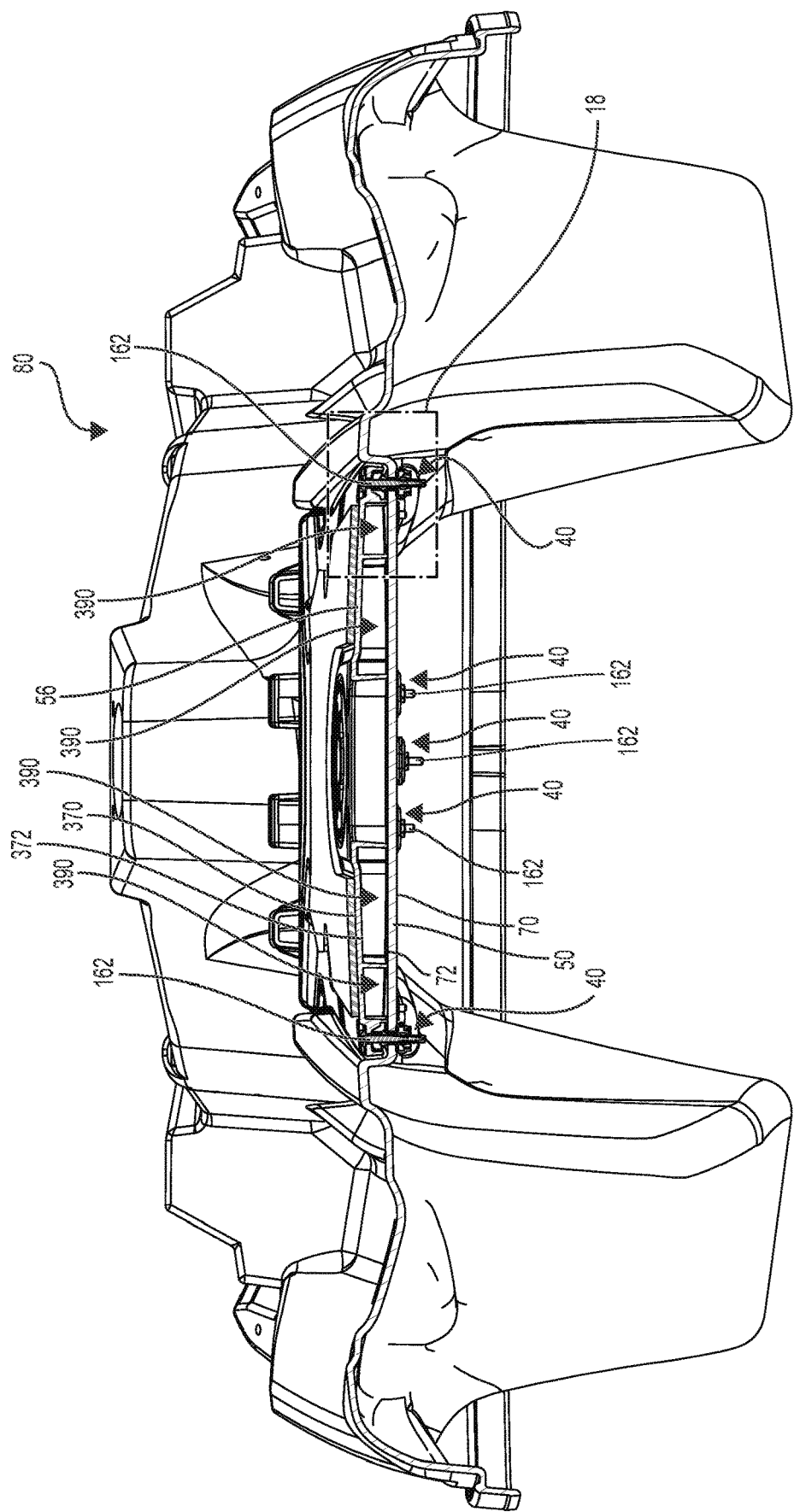
FIG. 17 is a cross-sectional view of the deck and deck panel of FIG. 14 taken along cross-section line 17-17 of FIG. 15.

Referring to FIGS. 14 to 18, the deck panel 56 has a top side 370 and an opposed bottom side 372. Ribs 380 project from the bottom side 372. The ribs 380 are shaped to abut on the visible side 72 of the receiving panel 50. Spaces 390 are formed between the ribs 380. As best seen in FIGS. 16 to 18, the spaces 390 are of different sizes and shapes. Spaces 392 are formed between the ribs 380 at locations of the deck panel 56 that extend above the panel apertures 60. The spaces 392 are shaped and sized to receive the portion of each resilient arm 250 of each anchor assembly 40 that extends on the visible side 72 of the receiving panel 50. Notably, the top 254 and the tab 252 of each resilient arm 250 extend in the space 392.

As can be seen in FIGS. 16 to 18, the anchor assemblies 40 and the deck panel 56 do not make contact, although it is contemplated that they could make contact. Holes 400 are defined in recessed portions 410 of the deck panel 56. The holes 400 extend between the top side 370 and the bottom side 372. The holes 400 have a diameter 402 (FIG. 18) that is larger than the diameter 164 of the shank 165 of the fastener 162. The diameter 402 is smaller than a diameter 172 of a head 170 of the fastener 162. The diameter 402 is also smaller than the dimensions 262, 264 of the panel aperture 60 shown in FIG. 11. The holes 400 are defined in the deck panel 56 so as to be in alignment with the axis 152 of the corresponding panel aperture 60 defined in the receiving panel 50.

After the deck panel 56 has been positioned on the visible side 72 of the receiving panel 50, the shank 165 of the fastener 162 is inserted into the hole 400. The shank 165 enters the channel 310, abuts the ribs 280 of the resilient arms 250, and is guided by the fastener guiding surfaces 342 and the resilient arms 250 towards the anchor aperture 150. When the shank 165 is received in the hole 192, the fastener 162 is rotated so that the fastener 162 threadingly engages the threaded surface 160 of the nut 190. When the thread of the fastener 162 engages the deformable collar 220 and as the fastener 162 is further rotated, the tapering edge portion 344 of each guide 340 abuts the surface 66 of the panel aperture 60 and helps maintain the anchor assembly 40 in with respect to the panel aperture 60. When the head 170 of the fastener 162 abuts the side 370 of the deck panel 56 and as the fastener 162 is further rotated, the anchor assembly 40 is moved towards the blind side 70 of the receiving panel 50 until the gasket 130 engages the blind side 70 of the receiving panel 50. As the fastener 162 gets tightened, the gasket 130 is compressed and provides for a sealed connection between the anchor assembly 40 and the receiving panel 50 so that water, for example, cannot pass through the panel aperture 60. The fastener 162 and the anchor assembly 40 together fasten the deck panel 56 to the receiving panel 50. These steps are repeated for each one of the anchor assemblies 40.

The fasteners 162 can then be unfastened from the anchor assemblies 40 when, for example, the deck panel 56 has to be removed. Unfastening the fasteners 162 from the anchor assemblies does not require holding or otherwise bracing the anchor assemblies 40 on the blind side 70 of the receiving panel 50. The anchor assemblies 40 can be reused or replaced and, in implementations where the nut 190 is removable from the nut cavity 180, the nut 190 can be replaced if needed.

Referring to FIGS. 19 to 22, an anchor assembly 440 according to a second implementation of the present technology is illustrated. For simplicity, components of the anchor assembly 440 that are similar to those of the anchor assembly 40 described above with reference to FIGS. 1 to 8 have been labeled with the same reference numerals and will not be described again herein.

Referring to FIGS. 19 to 22, in the anchor assembly 440, a gasket 450 is overmolded on a portion of the body 100. The gasket 450 is made of a resilient polymeric material, such as a rubber- or silicon-based material. The gasket 450 covers the engagement surface 112 entirely.

Figure 20:
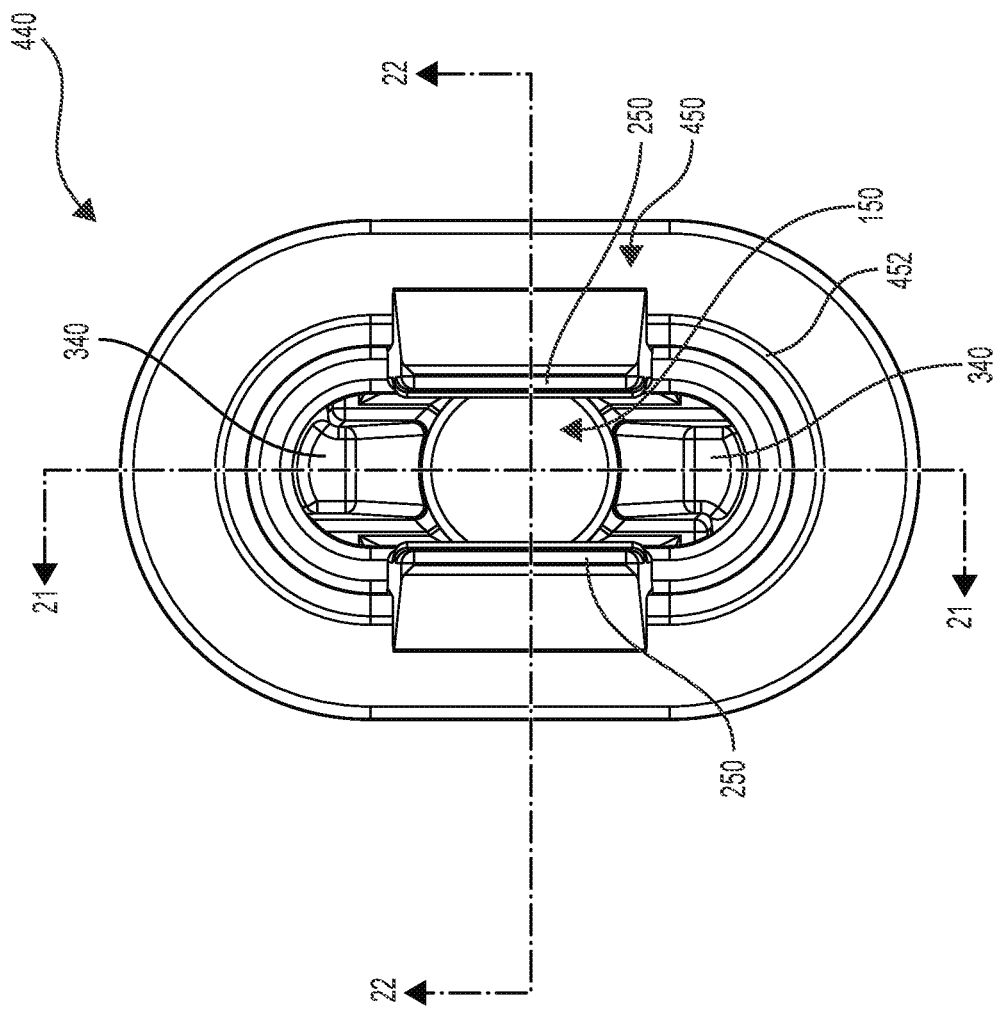
FIG. 20 is a top plan view of the anchor assembly of FIG. 19.
Figure 21:
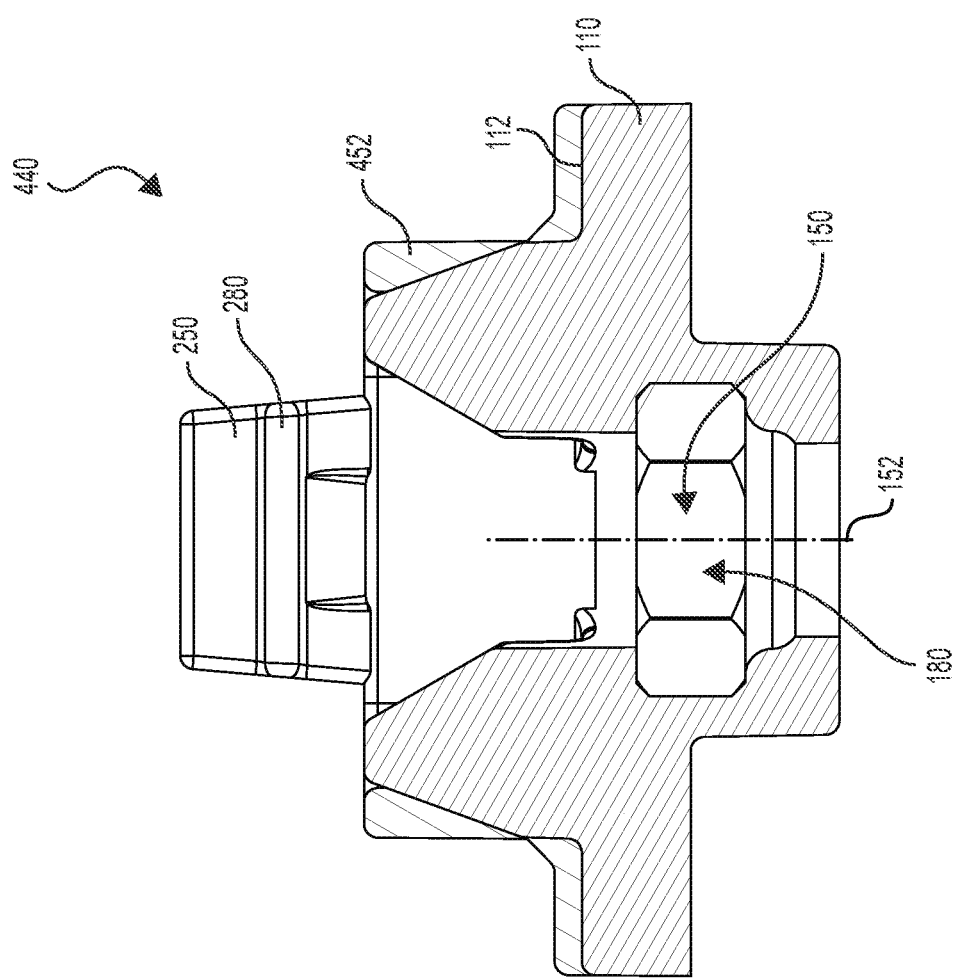
FIG. 21 is a cross-sectional view of the anchor assembly of FIG. 20 taken along cross-section line 21-21 of FIG. 20, with a nut omitted.
Figure 22:
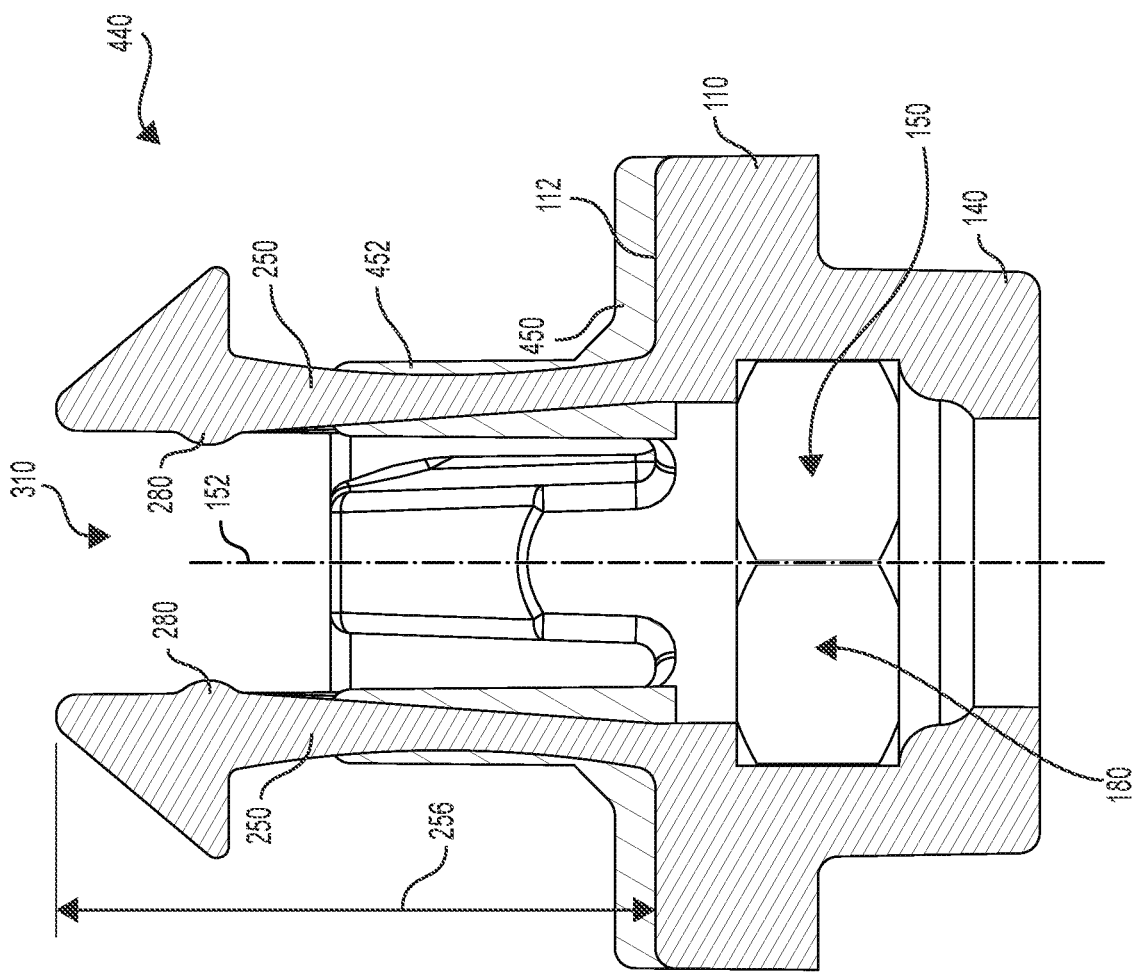
FIG. 22 is a cross-sectional view of the anchor assembly of FIG. 20 taken along cross-section line 22-22 of FIG. 20, with the nut omitted.

Still referring to FIGS. 19 to 22, the gasket 450 has a vertically extending wall 452. The wall 452 covers partially the guides 340 and the resilient arms 250. The gasket 450 covers the resilient arms 250 from the engagement surface 112 up to about half of the length 256 of the resilient arms 250 (FIG. 22). As best seen in FIG. 20, the vertically extending wall 452 has an oblong shape that corresponds to the oblong shape of the panel aperture 60. When the anchor assembly 440 is inserted in the panel aperture 60, the wall 452 is press fitted into the panel aperture 60. When the anchor assembly 440 is inserted in the panel aperture 60, the wall 452 extends between the anchor assembly 440 and the surface 66 defining the panel aperture 60.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. An anchor assembly for insertion in a panel aperture in a receiving panel, the receiving panel having a first side and a second side opposite to the first side, the anchor assembly comprising:
 a flange having an engagement surface locatable on the first side of the receiving panel, the flange having an oblong shape defining a major axis and a minor axis;

a plurality of resilient arms projecting from the engagement surface of the flange, the plurality of resilient arms being insertable in the panel aperture upon inward deflection thereof,
    each resilient arm having an outwardly facing tab structured and arranged for engaging the second side of the receiving panel so as to prevent removal of the anchor assembly from the panel aperture, and
    at least two of the plurality of resilient arms defining a channel therebetween for receiving a threaded fastener, the channel being sized so as to limit inward deflection of the at least two of the plurality of resilient arms when the threaded fastener extends within the channel;
a plurality of guides projecting from the engagement surface of the flange between the plurality of resilient arms, the plurality of guides being disposed along the major axis of the flange; and
a threaded surface located in the flange, the threaded surface forming at least in part an anchor aperture for alignment with the panel aperture, the channel being aligned with the anchor aperture and extending from a top of the at least two of the plurality of resilient arms up to the anchor aperture, the threaded surface being located between the plurality of resilient arms and being adapted for threadingly engaging the threaded fastener,
each guide of the plurality of guides having a fastener guiding surface configured for guiding the threaded fastener toward the anchor aperture as the threaded fastener is inserted into the channel.

2. The anchor assembly of claim 1, further comprising a gasket disposed on the engagement surface of the flange.

3. The anchor assembly of claim 2, wherein the gasket covers the engagement surface of the flange entirely.

4. The anchor assembly of claim 1, further comprising:
a body including the flange, the body defining a nut cavity; and
a nut received in the nut cavity, the nut defining the threaded surface.

5. The anchor assembly of claim 4, wherein the nut is a locknut including a deformable collar disposed adjacent to the threaded surface.

6. The anchor assembly of claim 1, wherein each one of the plurality of resilient arms has an inwardly protruding rib for abutting the threaded fastener when the threaded fastener extends within the channel.

7. The anchor assembly of claim 1, wherein the at least two of the plurality of resilient arms are disposed along the minor axis of the flange.

8. The anchor assembly of claim 7, wherein the at least two of the plurality of resilient arms are disposed on opposite sides of the major axis.

9. The anchor assembly of claim 8, wherein the at least two of the plurality of resilient arms is two resilient arms.

10. The anchor assembly of claim 9, wherein the tabs of the two resilient arms extend in opposite directions.

11. The anchor assembly of claim 10, wherein a distance between an outward tip of each tab is greater than a corresponding dimension of the panel aperture.

12. The anchor assembly of claim 1, wherein each fastener guiding surface tapers towards the anchor aperture for guiding the threaded fastener towards the anchor aperture.

13. The anchor assembly of claim 1, wherein the plurality of guides are structured and arranged to abut on a surface of the receiving panel defining the panel aperture so as to limit a rotation of the anchor assembly with respect to the receiving panel.

14. The anchor assembly of claim 1, further comprising the threaded fastener.

15. The anchor assembly of claim 1, further comprising a circular knob extending from a side of the flange opposite to the engagement surface.

16. The anchor assembly of claim 15, wherein the circular knob defines a knob aperture in alignment with the anchor aperture.

17. A parts assembly comprising:
a first part having a first side and second side opposite to the first side, the first part defining a first aperture;
an anchor assembly received in the first aperture, the anchor assembly including:
    a flange having an engagement surface, the flange being disposed on the first side of the first part, the flange having an oblong shape defining a major axis and a minor axis;
    a plurality of resilient arms projecting from the engagement surface of the flange, the plurality of resilient arms being inserted in the first aperture,
        each resilient arm having an outwardly facing tab structured and arranged for engaging the second side of the first part so as to prevent removal of the anchor assembly from the first aperture, and
        at least two of the plurality of resilient arms defining a channel therebetween;
    a plurality of guides projecting from the engagement surface of the flange between the plurality of resilient arms, the plurality of guides being disposed along the major axis of the flange; and
    a threaded surface located in the flange, the threaded surface forming at least in part an anchor aperture in alignment with the first aperture, the channel being aligned with the anchor aperture and extending from a top of the at least two of the plurality of resilient arms up to the anchor aperture, the threaded surface being located between the plurality of resilient arms;
a second part having a third side and a fourth side opposite to the third side, the third side facing the second side, the second part having a second aperture aligned with the anchor aperture; and
a threaded fastener extending through the second aperture, the channel and the anchor aperture, the threaded fastener threadingly engaging the threaded surface, the threaded fastener limiting inward deflection of the at least two of the plurality of resilient arms, the threaded fastener and the anchor assembly together fastening the second part to the first part,
each guide of the plurality of guides having a fastener guiding surface configured for guiding the threaded fastener toward the anchor aperture as the threaded fastener is inserted into the channel.

18. An anchor assembly for insertion in a panel aperture in a receiving panel, the receiving panel having a first side and a second side opposite to the first side, the anchor assembly comprising:
a flange having an engagement surface locatable on the first side of the receiving panel;
a plurality of resilient arms projecting from the engagement surface of the flange, the plurality of resilient arms being insertable in the panel aperture upon inward deflection thereof,
    each resilient arm having an outwardly facing tab structured and arranged for engaging the second side of the receiving panel so as to prevent removal of the anchor assembly from the panel aperture, and at least two of the plurality of resilient arms defining a channel therebetween for receiving a threaded fastener, the channel being sized so as to limit inward deflection of the at least two of the plurality of resilient arms when the threaded fastener extends within the channel;

a plurality of guides projecting from the engagement surface of the flange between the plurality of resilient arms; and a threaded surface located in the flange, the threaded surface forming at least in part an anchor aperture for alignment with the panel aperture, the channel being aligned with the anchor aperture and extending from a top of the at least two of the plurality of resilient arms up to the anchor aperture, the threaded surface being located between the plurality of resilient arms and being adapted for threadingly engaging the threaded fastener, and each guide of the plurality of guides including a fastener guiding surface that tapers towards the anchor aperture for guiding the threaded fastener towards the anchor aperture as the threaded fastener is inserted into the channel.

\* \* \* \* \*